United States Patent
Takamoto et al.

(10) Patent No.: US 7,941,511 B2
(45) Date of Patent: *May 10, 2011

(54) METHOD FOR REPRODUCING CONFIGURATION OF A COMPUTER SYSTEM IN A REMOTE SITE

(75) Inventors: Yoshifumi Takamoto, Kokubunji (JP); Takao Nakajima, Yokohama (JP); Naoki Utsunomiya, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/585,314

(22) Filed: Sep. 11, 2009

(65) Prior Publication Data

US 2010/0011095 A1    Jan. 14, 2010

Related U.S. Application Data

(63) Continuation of application No. 11/202,196, filed on Aug. 12, 2005, now Pat. No. 7,610,362.

(30) Foreign Application Priority Data

Apr. 8, 2005   (JP) ................. 2005-111809

(51) Int. Cl.
*G06F 15/177* (2006.01)
*G06F 15/173* (2006.01)
*G06F 11/00* (2006.01)
(52) U.S. Cl. ............. 709/220; 709/223; 709/227; 714/6
(58) Field of Classification Search .......... None
See application file for complete search history.

(56) References Cited

U.S. PATENT DOCUMENTS

| 6,636,988 | B1 | 10/2003 | Firley et al. |
| 7,020,744 | B2 | 3/2006 | Nishikawa et al. |
| 2002/0174211 | A1 | 11/2002 | Ishizaki et al. |
| 2003/0177206 | A1 | 9/2003 | Whitlow |
| 2005/0015657 | A1 | 1/2005 | Sugiura et al. |
| 2006/0010341 | A1 | 1/2006 | Kodama |
| 2006/0074957 | A1 | 4/2006 | Yamamoto et al. |

FOREIGN PATENT DOCUMENTS

| JP | 09-293001 | 4/1996 |
| JP | 11-353292 | 6/1998 |
| JP | 2004-295465 | 3/2003 |

OTHER PUBLICATIONS

Office Action from Japanese Patent Office mailed Jan. 26, 2010.

*Primary Examiner* — Wen-Tai Lin
(74) *Attorney, Agent, or Firm* — Stites & Harbison, PLLC; Juan Carlos A. Marquez, Esq

(57) ABSTRACT

A computer system formerly handles a service that is quickly reproduced with another computer system to resume the service immediately. The association relations between services run by a primary site (1) and primary site servers (13), between the primary site servers (13) and a primary site storage system (15), and between the storage system (15) of the primary site (1) and a storage system (25) of a secondary site (2) are collected. The collected association relations are copied as configuration information from the storage system (15) of the primary site (1) to the secondary site (2). On the secondary site (2), based on the copied configuration information, services of the primary site (1) are assigned to servers (23) of the secondary site (2), and the secondary site servers (23) are associated with the storage system (25) of the secondary site (2) to reproduce the primary site (1) thereon.

26 Claims, 28 Drawing Sheets

SERVICE MANAGEMENT TABLE

| SITE IDENTIFIER (401) | SERVICE IDENTIFIER (411) | PRIORITY (412) | SERVER IDENTIFIER (413) | RECOVERY REQUIRED (414) |
|---|---|---|---|---|
| SITE 1 | SERVICE 1 | 1 | SERVER 1 | REQUIRED |
| | | | SERVER 2 | |
| | SERVICE 2 | 2 | SERVER 3 | REQUIRED |
| | SERVICE 3 | 3 | SERVER 4 | NOT REQUIRED |
| | | | SERVER 5 | |

SERVER MANAGEMENT TABLE 42

| SITE IDENTIFIER 401 | SERVER IDENTIFIER 421 | PROCESSOR CLASSIFICATION 422 | MEMORY 423 | DEVICE 424 | IP ADDRESS 425 | STORAGE 426 | STATUS 427 |
|---|---|---|---|---|---|---|---|
| SITE 1 | SERVER 1 | CPU1/ 3GHz | 1GB | NIC1/ MAC1 | NIC1/IP1 | FCA1/LU0:10GB FCA1/LU1:20GB FCA1/LU3:50GB | IN USE |
| | | | | NIC2/ MAC2 | | | |
| | | | | FCA1/WWN1 | NIC2/IP2 | FCA2/LU0:10GB FCA2/LU1:20GB | |
| | | | | FCA2/WWN2 | | | |
| | | CPU1/ 2GHz | 2GB | NIC3/MAC3 | NIC3/IP3 | FCA3/LU0:20GB FCA3/LU1:40GB | IN USE |
| | | | | FCA3/WWN3 | | | |
| | | CPU2/ 1GHz | 4GB | NIC4/ MAC4 | NIC4/IP4 | FCA4/LU0:20GB | IN USE |
| | | | | FCA4/WWN4 | | | |
| | | CPU2/ 3GHz | 2GB | NIC5/ MAC5 | NIC5/IP5 | FCA5/LU1:40GB | NOT IN USE |
| | | | | FCA5/WWN5 | | | |
| | | CPU2/ 3GHz | 2GB | NIC6/ MAC6 | NIC6/IP6 | FCA5/LU1:40GB | IN USE |
| | | | | FCA6/WWN6 | | | |

NETWORK SWITCH MANAGEMENT TABLE

| SITE IDENTIFIER | NETWORK SWITCH IDENTIFIER | PORT NUMBER | PORT MAC | VLAN NUMBER | CONNECTED DEVICE |
|---|---|---|---|---|---|
| SITE 1 | SWITCH 1 | 1 | PMAC1 | 10 | MAC1 |
| | | 2 | PMAC2 | 10 | MAC2 |
| | | 3 | PMAC3 | 10 | MAC3 |
| | | 4 | PMAC4 | 20 | MAC4 |
| | | 5 | PMAC5 | 30 | MAC5 |
| | | 6 | PMAC6 | 40 | PMAC12 |
| | SWITCH 2 | 1 | PMAC7 | 30 | MAC6 |
| | | 2 | PMAC8 | 20 | MAC7 |
| | | 3 | PMAC9 | 30 | MAC8 |
| | | 4 | PMAC10 | 30 | MAC9 |
| | | 5 | PMAC11 | 40 | MAC10 |
| | | 6 | PMAC12 | 40 | PMAC6 |

FIG. 9

STORAGE SWITCH MANAGEMENT TABLE

| SITE IDENTIFIER | STORAGE SWITCH IDENTIFIER | PORT NUMBER | PORT WWN | ZONE NUMBER | CONNECTED DEVICE |
|---|---|---|---|---|---|
| SITE 1 | SWITCH 1 | 1 | PWWN1 | 10 | WWN1 |
| | | 2 | PWWN2 | 10 | WWN2 |
| | | 3 | PWWN3 | 10 | WWN3 |
| | | 4 | PWWN4 | 20 | WWN 4 |
| | | 5 | PWWN5 | 30 | WWN 5 |
| | | 6 | PWWN6 | 30 | WWN6 |
| | | 7 | PWWN7 | 10 | ST1P0 |
| | | 8 | PWWN8 | 10 | ST1P1 |
| | | 9 | PWWN9 | | |
| | | 10 | PWWN10 | | |
| | | 11 | PWWN11 | 20 | ST2P0 |
| | | 12 | PWWN12 | 30 | ST2P1 |

45 STORAGE MANAGEMENT TABLE

| SITE IDENTIFIER | STORAGE SYSTEM IDENTIFIER | SERVER IDENTIFIER | DISK NUMBER | COPY DESTINATION |
|---|---|---|---|---|
| SITE 1 | STORAGE 1 | WWN1 | LU0 | SITE IDENTIFIER = 2<br>SYSTEM IDENTIFIER = 10<br>LU=10 |
| | | | LU1 | SITE IDENTIFIER = 2<br>SYSTEM IDENTIFIER = 10<br>LU=11 |
| | | | LU3 | SITE IDENTIFIER = 2<br>SYSTEM IDENTIFIER = 10<br>LU=13 |
| | | WWN2 | LU0 | SITE IDENTIFIER = 2<br>SYSTEM IDENTIFIER = 10<br>LU=10 |
| | | | LU1 | SITE IDENTIFIER = 2<br>SYSTEM IDENTIFIER = 10<br>LU=11 |
| | STORAGE 2 | WWN3 | LU0 | SITE IDENTIFIER = 2<br>SYSTEM IDENTIFIER = 10<br>LU=20 |
| | | | LU1 | SITE IDENTIFIER = 2<br>SYSTEM IDENTIFIER = 10<br>LU=21 |
| | | WWN4 | LU0 | SITE IDENTIFIER = 2<br>SYSTEM IDENTIFIER = 10<br>LU=20 |
| | | WWN5 | LU1 | SITE IDENTIFIER = 2<br>SYSTEM IDENTIFIER = 10<br>LU=21 |
| | | WWN6 | LU1 | SITE IDENTIFIER = 2<br>SYSTEM IDENTIFIER = 10<br>LU=21 |

FIG. 11

42    SERVER MANAGEMENT TABLE

| 401 | 421 | 422 | 423 | 424 | 425 | 426 | 427 |
|---|---|---|---|---|---|---|---|
| SITE IDENTIFIER | SERVER IDENTIFIER | PROCESSOR CLASSIFI-CATION PROCESSOR | MEMORY | DEVICE | IP ADDRESS | STORAGE | STATUS |
| SITE 1 | SERVER 1 (PHYSICAL COMPUTER) | CPU1/3GHz × 4PROCESSOR | 2GB | NIC1/MAC1 | NIC1/IP1 | FC1/LU1:10GB FC1/LU2:20GB FC2/LU5:50GB FC2/LU6:100GB | IN USE |
|  |  |  |  | NIC2/MAC2 | NIC2/IP2 |  |  |
|  |  |  |  | NIC3/MAC3 |  |  |  |
|  |  |  |  | NIC4/MAC4 | NIC3/IP3 |  |  |
|  |  |  |  | FC1/WWN1 | NIC4/IP4 |  |  |
|  |  |  |  | FC2/WWN2 |  |  |  |
|  | SERVER 2 (LOGICAL COMPUTER) | CPU1/3GHz × 2PROCESSOR | 1GB | NIC1/MAC1 | NIC1/IP1 | FC1/LU1:10GB FC1/LU2:20GB | IN USE |
|  |  |  |  | NIC2/MAC2 | NIC2/IP2 |  |  |
|  |  |  |  | FC1/WWN1 |  |  |  |
|  | SERVER3 (LOGIICAL COMPUTER) | CPU1/3GHz × 2PROCESSOR | 1GB | NIC3/MAC1 | NIC3/IP3 | FC2/LU5:50GB FC2/LU6:100GB | IN USE |
|  |  |  |  | NIC4/MAC2 | NIC4/IP4 |  |  |
|  |  |  |  | FC2/WWN2 |  |  |  |

FIG. 25

METHOD FOR REPRODUCING CONFIGURATION OF A COMPUTER SYSTEM IN A REMOTE SITE

CROSS-REFERENCE TO RELATED APPLICATIONS

This application is a Continuation Application of U.S. application Ser. No. 11/202,196 filed on Aug. 12, 2005 now U.S. Pat. No. 7,610,362. The present application claims priority from U.S. application Ser. No. 11/202,196 filed on Aug. 12, 2005, which claims priority from Japanese application 2005-111809 filed on Apr. 8, 2005, the content of which is hereby incorporated by reference into this application.

BACKGROUND OF THE INVENTION

This invention relates to a technique of reproducing a configuration for a system that is to take over a server or a service in the event of failover, server integration, or the like.

It is very important for a business to continue providing services despite failures and disasters, and disaster recovery systems are known in the field of Information Technology (IT) systems. In a disaster recovery system, two sites, primary and secondary, which can exchange data with each other are prepared, and data of a service of the primary site is constantly backed up to the secondary site so that the service is kept provided after a disaster or the like on the secondary site.

The secondary site has to have the same server and network configuration as the primary site in order to resume the service after a failure or a disaster damages the primary site with the use of the data backed up to the secondary site (the secondary site is reconfigured to have the same configuration as the primary site). In a known method, the administrator of the secondary site sets, in advance, a configuration setting procedure in the form of script or the like, and the script is executed to reconfigure the secondary site as a recovery operation to start providing the service on the secondary site (see U.S. Pat. No. 6,636,988, for example).

The script contains server processor definitions, OS settings definitions, storage system definitions, network definitions, and the like that are manually set by the administrator in advance.

SUMMARY OF THE INVENTION

However, even with a script as the one described above, it could take half a day to several days since reconfiguration of the secondary site is started until the service is ready to be resumed. The method using a script is not capable of reconfiguring the secondary site quickly and easily for the following reasons:

One is that every change in configuration of the primary site has to be reflected on the script of the secondary site. Updating the script manually from day to day is very labor-consuming and raises the management cost since, on the primary site, an increase in capacity to store data makes changes to a storage system or volume where data is stored, a change in server processing load changes a server or a processor, and a change in server or storage system changes the configuration of an IP (Internet Protocol) network and a SAN (Storage Area Network).

Another reason is that it is common for the secondary site to keep its storage system and server computer in operation constantly and have these computer resources perform a service different from the one provided by the primary site in order to make full use of the primary site and the secondary site. In the case where the service provided by the secondary site cannot be halted for the recovery of the service of the primary site, reconfiguration of the secondary site will be complicated from shortage of computer resources and overlapping of network definitions (e.g., VLAN IDs) and accordingly take longer time.

In recent years, a technique using a blade server, which can switch computers on a substrate basis, has been introduced to enable an IT system to change its configuration more flexibly. With this technique, a multitude of servers can now be integrated into a blade server (server consolidation or server integration).

Reconfiguration of an old system to a new system for server integration relies mostly on manual labor as in the recovery operation described above. Thus the transition from an old system to a new system takes a considerable amount of time.

This invention has been made in view of the above problems, and it is therefore an object of this invention to provide a technique of quickly reproducing a computer system that has formerly handled a service with another computer system to resume the service immediately.

This invention relates to a method of causing a second computer system, which has server devices and a storage system, to execute a service or services that have been executed by a first computer system, which has server devices and a storage system, the method including, to reproduce the first computer system in the second computer system: collecting service-server device association relations between the services and the server devices that are run in the first computer system; collecting server device-storage system association relations in the first computer system; collecting an association relation between the storage system of the first computer system and the storage system of the second computer system; storing as configuration information, in the storage system of the first computer system, the service-server device association relations in the first computer system, the server device-storage system association relations in the first computer system, and the association relation between the storage system of the first storage system and the second computer system; copying data of the services of the first computer system and the stored configuration information to the second computer system; assigning services of the first computer system to server devices of the second computer system based on the copied configuration information of the first computer system; and associating the server devices of the second computer system, to which the services of the first computer system are assigned, with the storage system of the second computer system based on the configuration information.

According to this invention, with configuration information of the first computer system copied to the second computer system, the first computer system can automatically be reproduced in the second computer system from the copy of the configuration information no matter how many changes are made to the configuration of a server device, a storage system, and the like in the first computer system.

Since the first computer system can be reproduced automatically unlike the above-described examples of prior art where human intervention is necessary, the second computer system can be reconfigured very quickly. In application to recovery from disaster, in particular, the second computer system can take over the first computer system within a very short period of time, which shortens the service interruption period significantly and minimizes the damage to the company or organization.

In application to server integration, the administrator can use configuration information of the first computer system to automatically integrate servers into the second computer system. Thus, the enormous amount of labor and time required in conventional server integration is cut down greatly and a new computer system can start operating in significantly less time after introduction.

BRIEF DESCRIPTION OF THE DRAWINGS

FIG. 7 is an explanatory diagram showing an example of a service management table in the configuration information management facility.

FIG. 8 is an explanatory diagram showing an example of a server management table in the configuration information management facility.

FIG. 9 is an explanatory diagram showing an example of a network switch management table in the configuration information management facility.

FIG. 11 is an explanatory diagram showing an example of a storage management table in the configuration information management facility.

FIG. 25 is an explanatory diagram showing an example of a server management table in the configuration information management facility according to the third embodiment.

DETAILED DESCRIPTION OF THE PREFERRED EMBODIMENTS

Embodiments of this invention will be described below with reference to the accompanying drawings.

Figure 1:
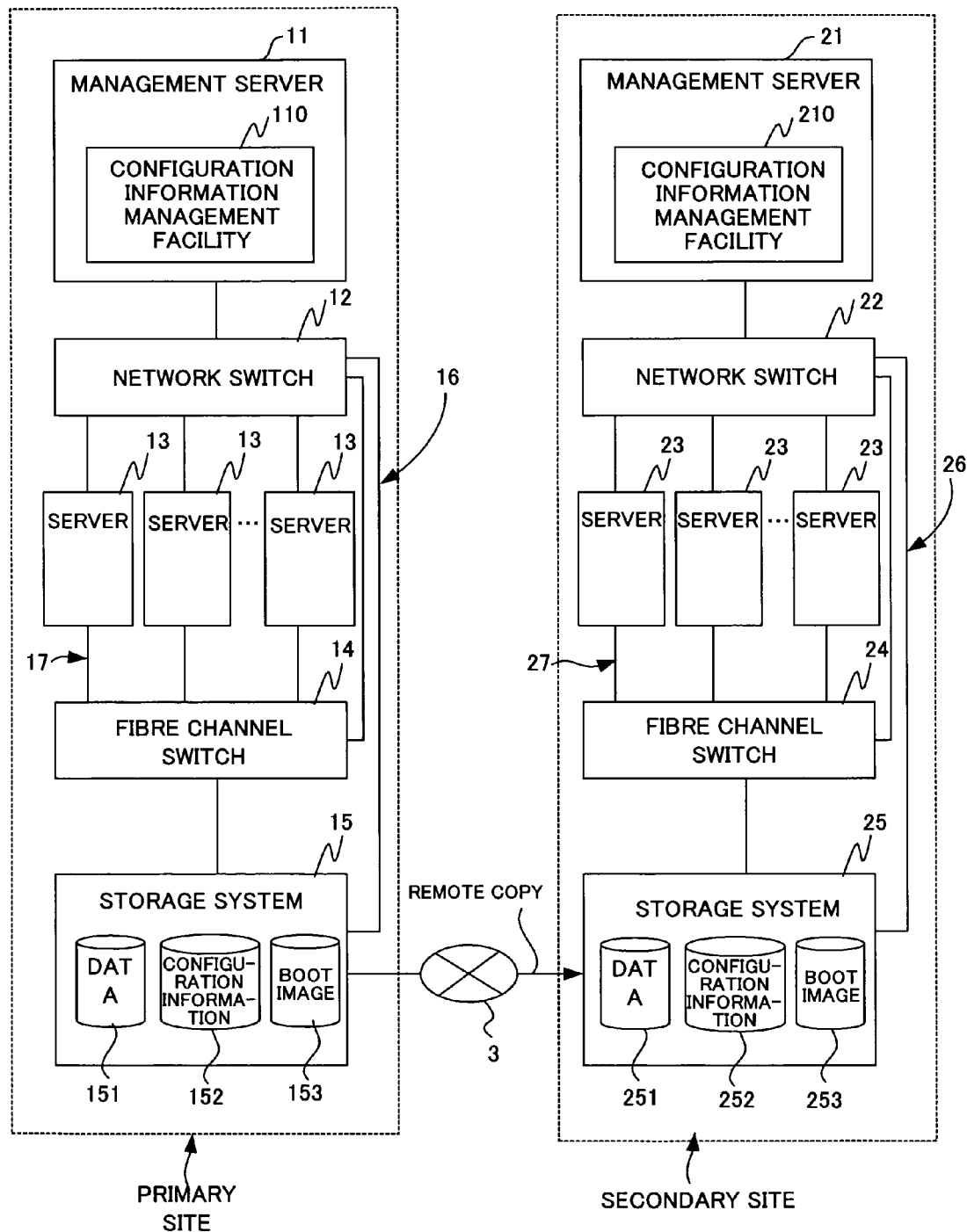
FIG. 1 is a block diagram showing a disaster recovery system according to a first embodiment of this invention.

FIG. 1 shows, as a first embodiment of this invention, an example of applying this invention to disaster recovery in which data of a computer system on a primary site 1 is copied to a computer system on a secondary site 2.

The computer system on the primary site 1 (first computer system) has plural servers (server devices) 13 to provide a given service with the use of data stored in a storage system 15. A copy of the data stored in the storage system 15 of the primary site 1 is transferred to and stored in a storage system 25 of the secondary site 2 through a remote copy function via an inter-storage network 3. The remote copy function used to transfer data from the storage system 15 performs synchronous remote copy or asynchronous remote copy. The storage system 15 or 25 may not be a single storage system but may be a group of storage systems.

The plural servers 13 of the primary site 1 are connected to one another via an IP network 16, which is built around a network switch 12. The servers 13 are connected to the storage system 15 via a Storage Area Network (SAN) 17, which is built around a Fibre Channel switch 14.

Connected to the IP network 16 is a management server 11, which manages the configuration of the primary site 1. The management server 11 has a configuration information management facility 110 running to obtain and manage information on the configuration of the primary site 1, including the hardware configuration, the software configuration and the network configuration. When there is a change in configuration of the primary site 1, or at other given timing, the configuration information management facility 110 obtains the above configuration information of the primary site 1, and stores the obtained configuration information in a configuration information storing area 152, which is set in advance in the storage system 15.

The IP network 16 is also connected to the SAN 17 and to the storage system 15. Over the IP network 16, the management server 11 collects the configuration information of the primary site 1 and stores the collected information in the configuration information storing area 152 of the storage system 15.

The servers 13, which provide given services, access a data storing area 151, which is set in advance in the storage system 15, via the SAN 17 to refer to or update service data stored in the data storing area 151.

The storage system 15 uses the remote copy function to copy data in the data storing area 151 and in the configuration information storing area 152 to the storage system 25 of the secondary site 2 which is set in advance. The storage system 25 stores the copy of data in the data storing area 151 of the primary site 1 in a data storing area 251, which is set in advance, and stores the copy of data in the configuration information storing area 152 of the primary site 1 in a configuration information storing area 252, which is set in advance. Applications of services executed by the servers 13 and boot images of OSs and other programs of the servers 13 are stored in a given image storing area 153. In this way, software necessary for a service provided by the primary site 1 can automatically be transferred to an image storing area 253 of the secondary site 2 through remote copy.

The computer system on the secondary site 2 (second computer system), which keeps a copy of data of services provided by the primary site 1 and a copy of configuration information of the primary site 1, is similar to the computer system on the primary site 1 in that plural servers (server devices) 23 are connected to a management server 21 via an IP network 26, which is built around a network switch 22, and that the servers 23 are connected to the storage system 25 via an SAN 27, which is built around a Fibre Channel switch 24. The IP network 26 is also connected to the Fibre Channel switch 24 and to the storage system 25, thereby enabling the management server 21 to access the SAN 27 and the storage system 25.

The management server 21 has a configuration information management facility 210 running to obtain and manage information on the configuration (hardware configuration, software configuration and network configuration) of the secondary site 2. The configuration information management facility 210 has a re-creation facility (program module) 112, which, upon instruction from an administrator or the like, reads configuration information of the primary site 1 out of the configuration information storing area 252 of the storage system 25 to re-create the configuration and services of the primary site 1 on the secondary site 2. The administrator accesses the management server 21 via a terminal connected to the IP network 26, or the like.

On the secondary site 2, the servers 23 and the storage system 25 can provide services different from those provided by the primary site 1.

The network switch 12 or 22 may not be a single network switch but may be a group of network switches. The Fibre Channel switch 14 or 24 may not be a single Fibre Channel switch but may be a group of Fibre Channel switches.

Figure 2:
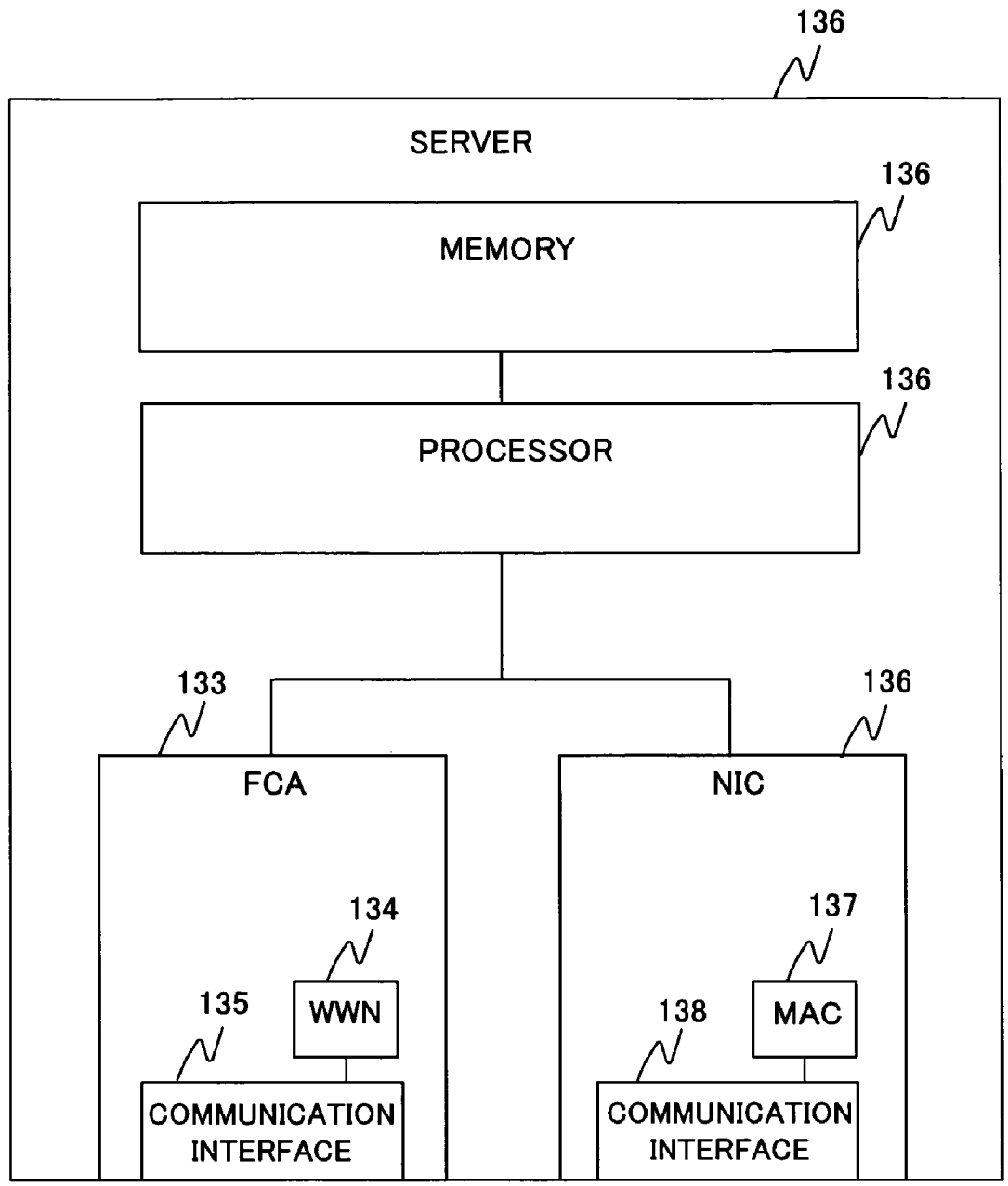
FIG. 2 is a block diagram showing a server configuration.

FIG. 2 is a block diagram showing the configuration of the servers 13 of the primary site 1. The servers 13 are each equipped with a memory 131, which is accessed by a processor 132, a Network Interface Card (NIC) 136, which converts signals when the processor 132 access the IP network 16, and a Fibre Channel Adapter (FCA) 133, which converts signals when the processor 132 accesses the SAN 17.

The FCA 133 has a World Wide Name (WWN), which is a globally unique identifier, and communicates with the SAN 17 through a communication facility 135. The NIC 136 has Media Access Control (MAC) 137, which is a globally unique identifier, and communicates with the IP network 16 through a communication facility 138.

The servers 23 of the secondary site 2 have a configuration similar to that of the servers 13, and redundant descriptions will be omitted.

Figure 3:
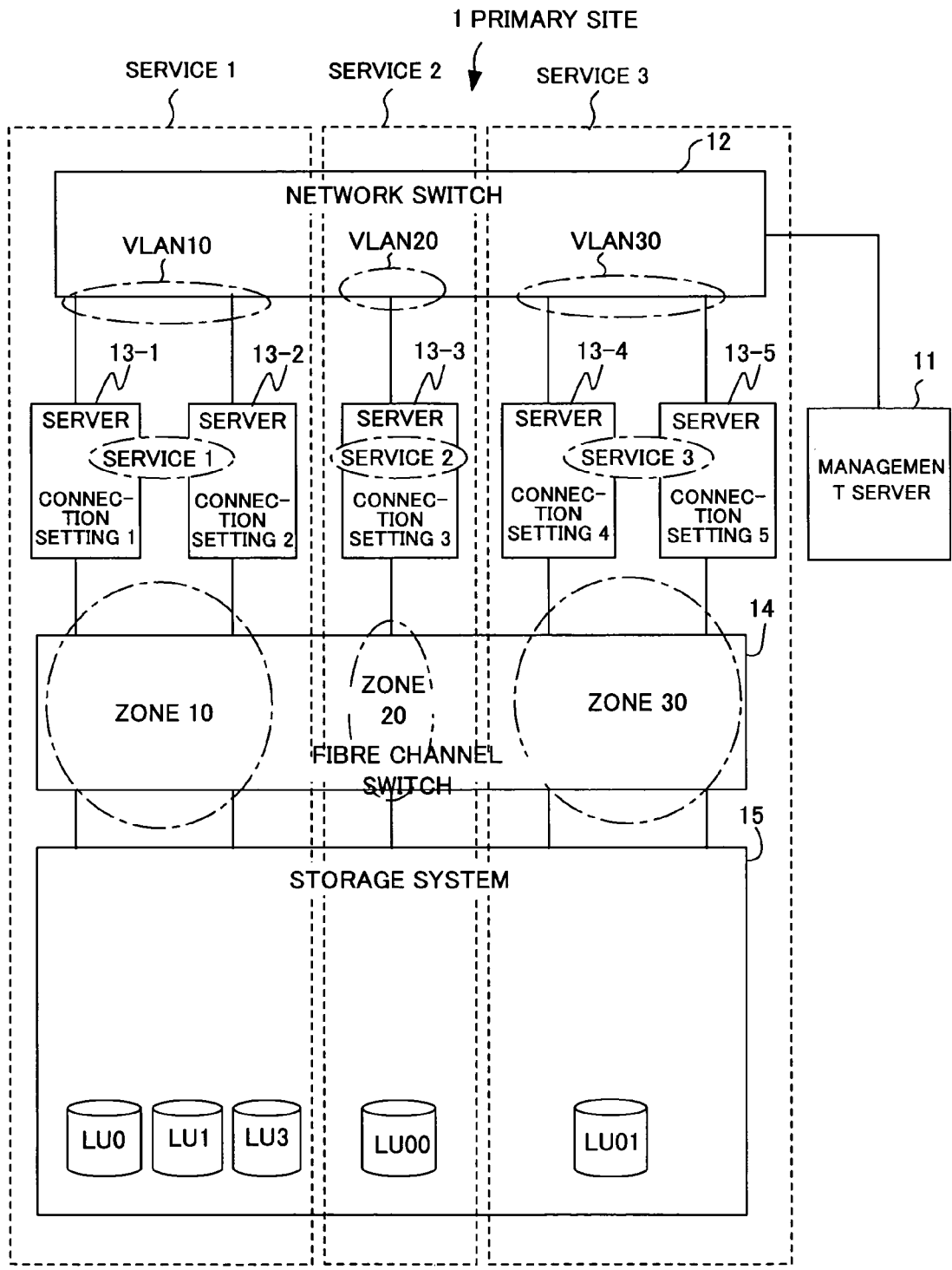
FIG. 3 is a block diagram showing the relations between services and a computer system on a primary site.

FIG. 3 is a block diagram showing an example of how services are provided by the primary site 1. With service identifiers defined in a service management table, which will be described later with reference to FIG. 7, the primary site 1 is logically partitioned into VLAN groups of the IP network 16 and zones of the SAN 17, and is set to avoid overlapping of access between services. In the example of FIG. 3, the primary site 1 has five servers 13-1 to 13-5, which are partitioned into three service groups. The service-providing servers of the primary site 1 are generically denoted by 13, and individually denoted by 13-1 to 13-5.

The network switch 12 (IP network 16) is divided into three VLAN groups (VLANs 10, 20 and 30) whereas the Fibre Channel switch 14 (SAN 17) is divided into three zones (Zone 10, 20 and 30). The VLAN groups and the zones are identified by identifiers 10, 20 and 30.

The service group that provides Service One is constituted of two servers, 13-1 and 13-2, allocated to VLAN 10 and Zone 10. The servers 13-1 and 13-2 are connected to client computers (not shown) via VLAN 10 of the IP network 16, and the client computers receive Service One executed by the servers 13-1 and 13-2.

The servers 13-1 and 13-2 access the data storing area 151 of the storage system 15 via Zone 10 of the SAN 17.

Assigned as the data storing area 151 here are logical disks LU0 to LU3, LU00 and LU01, which are set in advance in the storage system 15. The logical disks LU0, LU1 and LU3 are allocated to Zone 10 to which the servers 13-1 and 13-2 belong.

The service group that provides Service Two is constituted of the server 13-3, which is allocated to VLAN 20 and Zone 20. The server 13-3 is connected to client computers (not shown) via VLAN 20 of the IP network 16, and the client computers receive Service Two executed by the server 13-3.

The server 13-3 accesses the data storing area 151 of the storage system 15 via Zone 20 of the SAN 17. Assigned as a portion of the data storing area 151 for Service Two is the logical disk LU00.

The service group that provides Service Three is constituted of two servers, 13-4 and 13-5, allocated to VLAN 30 and Zone 30. The servers 13-4 and 13-5 are connected to not-shown client computers via VLAN 30 of the IP network 16, and the client computers receive Service Three executed by the servers 13-4 and 13-5.

The servers 13-4 and 13-5 access the data storing area 151 of the storage system 15 via Zone 30 of the SAN 17. Assigned as a portion of the data storing area 151 for Service Three is the logical disk LU01.

Given logical disks are assigned as the configuration information storing area 152 and as the image storing area 153. For instance, the logical disk LU2, which will be described later with reference to FIG. 4, is set as these storing areas.

Figure 4:
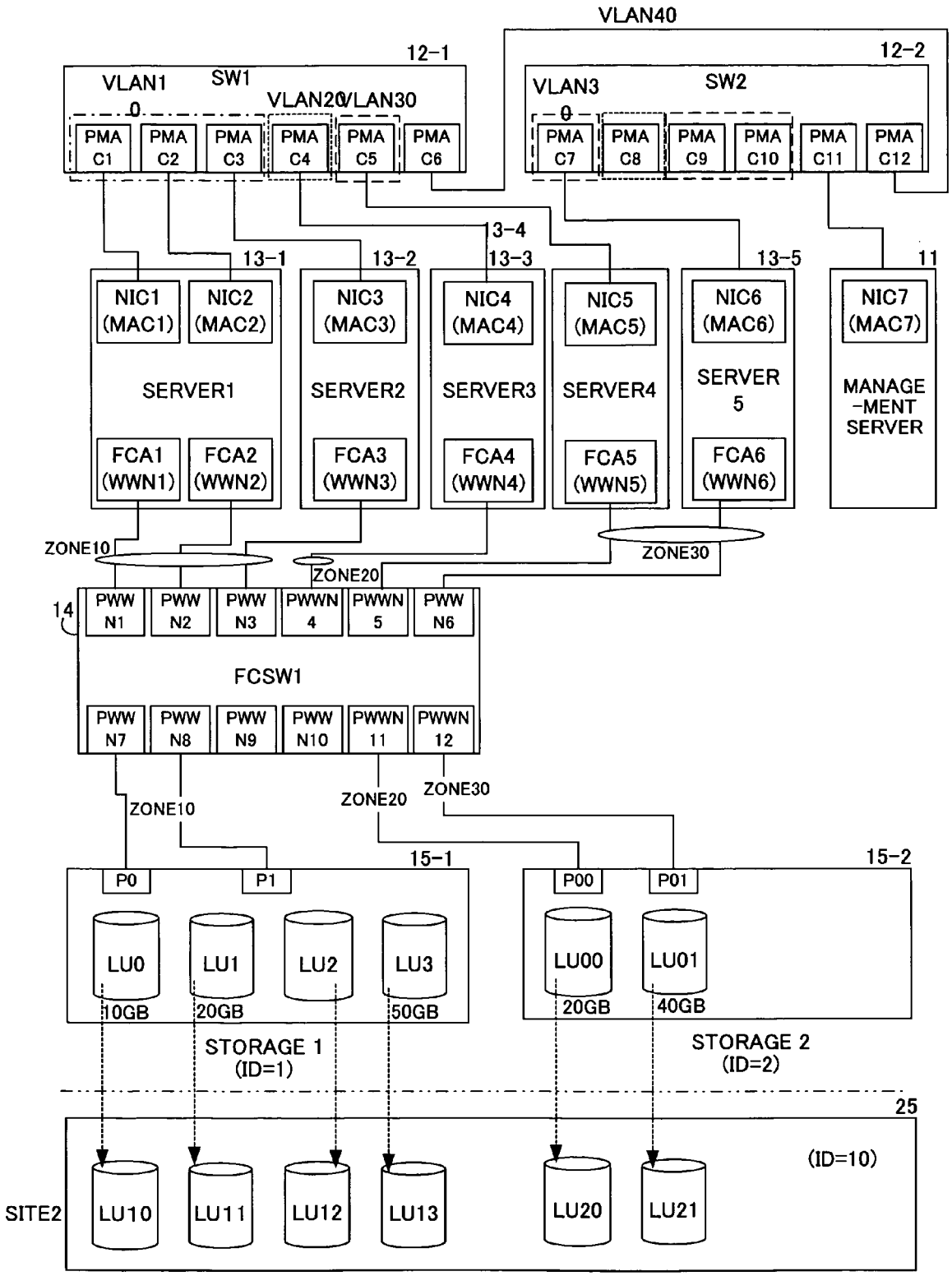
FIG. 4 is a block diagram showing the relation between the computer system on the primary site and a storage system on a secondary site.

FIG. 4 is a block diagram illustrating details of the configuration of the primary site 1 which is shown in FIG. 3. In the example of FIG. 4, the network switch 12 shown in FIG. 1 is constituted of two network switches 12-1 (SW1) and 12-2 (SW2), and the storage system 15 is constituted of two storage systems 15-1 (ST1) and 15-2 (ST2). The network switches of the primary site 1 are generically denoted by 12 and individually denoted by 12-1 and 12-2. Similarly, the storage systems of the primary site 1 are generically denoted by 15 and individually denoted by 15-1 and 15-2.

The server 13-1 (Server One) has two NICs, NIC1 and NIC2. MAC1 is set as an MAC address to NIC1 whereas MAC2 is set to NIC2. IP1 is set as an IP address to NIC1 whereas IP2 is set to NIC2.

The servers 13-2 to 13-5 (Server Two to Server Five) each have one NIC (NIC3 to NIC6). MAC3 to MAC6 are set as MAC addresses to NIC3 to NIC6, respectively. IP3 to IP6 are assigned as IP addresses to NIC3 to NIC6, respectively. NIC1 to NIC3 of the servers 13-1 and 13-2, which provide Service One, are connected to Port One to Port Three belonging to VLAN 10 of the network switch 12-1.

NIC4 of the server 13-3, which provides Service Two, is connected to Port Four belonging to VLAN 20 of the network switch 12-1. NIC5 and NIC6 of the servers 13-4 and 13-5, which provide Service Three, are connected to Port Five and Port Seven belonging to VLAN 30 of the network switches 12-1 and 12-2.

Port Six and Port Twelve are connected to the network switches 12-1 and 12-2, enabling the network switches 12-1 and 12-2 to access each other. The management server 11, which manages the configuration of the primary site 1, is connected to Port Eleven of the network switch 12-2.

The server 13-1 (Server One) has two FCAs, FCA1 and FCA2. WWN1 is set as an address to FCA1 whereas WWN2 is set to FCA2.

The servers 13-2 to 13-5 each have one FCA (FCA3 to FCA6). WWN3 to WWN6 are set as addresses to FCA3 to FCA6, respectively.

FCA1 to FCA3 of the servers 13-1 and 13-2, which provide Service One, are connected to Port One to Port Three belonging to Zone 10 of the Fibre Channel switch 14.

FCA4 of the server 13-3, which provides Service Two, is connected to Port Four belonging to Zone 20 of the Fibre Channel switch 14. FCA5 and FCA6 of the servers 13-4 and 13-5, which provide Service Three, are connected to Port Five and Port Six belonging to Zone 30 of the Fibre Channel switch 14.

Ports P0 and P1 of the storage system 15-1 are connected to Port Seven and Port Eight of the Fibre Channel switch 14, respectively. Ports P00 and P01 of the storage system 15-2 are connected to Port Eleven and Port Twelve of the Fibre Channel switch 14, respectively.

The logical disks LU0 to LU3 are set as the storage system 15-1 whereas the logical disks LU00 and LU01 are set as the storage system 15-2. For instance, the logical disks LU0, LU1, LU3, LU00 and LU01 are set as the data storing area 151 shown in FIG. 1, while setting the logical disk LU2 as the configuration information storing area 152. Which of the servers 13-1 to 13-5 accesses through a path set as will be described later is set for each of the logical disks LU0 to LU3, LU00 and LU11.

Plural logical disks, LU10 to LU13, LU20 and LU21 in the example of FIG. 4, are set as the storage system 25 of the secondary site 2, to keep information of the primary site 1 through the remote copy function of the storage systems 15-1 and 15-2. An example of remote copy settings of the storage systems 15-1 and 15-2 is shown in FIG. 4, in which the storage system 15-1 copies data in the logical disks LU0 to LU3 to the logical disks LU10 to LU13 of the storage system 25 on the secondary site 2 whereas the storage system 15-2 copies data in the logical disks LU00 and LU01 to the logical disks LU20 and LU21 of the storage system 25 on the secondary site 2. In this example, the logical disks LU0, LU1, LU3, LU00 and LU01 correspond to the data storing area 251 whereas the logical disk LU2 corresponds to the configuration information storing area 252.

Figure 5:
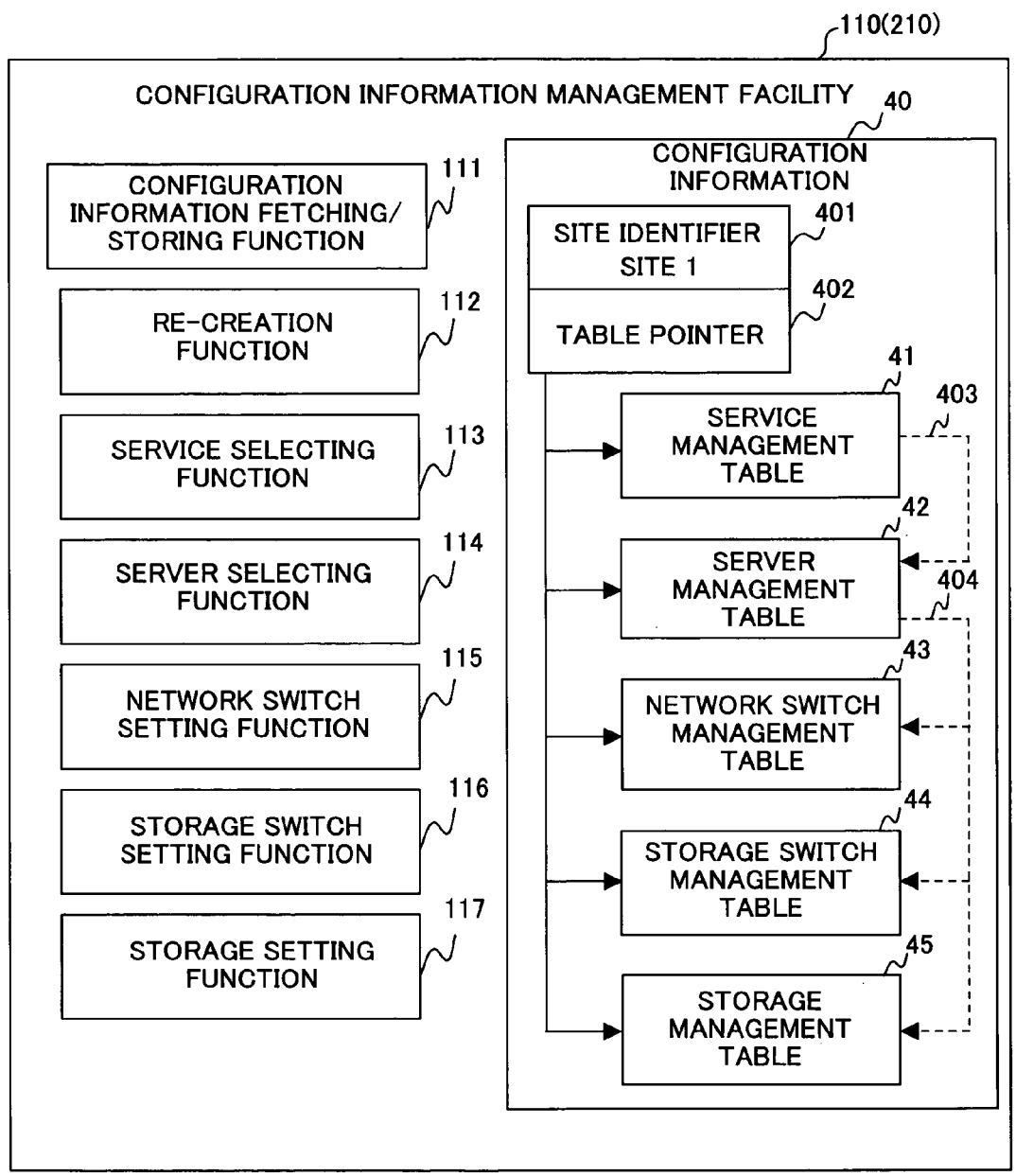
FIG. 5 is a block diagram showing a configuration information management facility set up on the primary site and the secondary site each.

FIG. 5 is a block diagram showing details of the configuration information management facilities 110 and 210 in the management servers 11 and 21. The configuration information management facility 110 of the primary site 1 and the configuration information management facility 210 of the secondary site 2 have the same configuration, but execute different functions.

The major function in the configuration information management facility 110 of the primary site 1 is the configuration information fetching/storing function 111 with which configuration information 40 of the primary site 1 is obtained and stored in the storage system 15.

The configuration information fetching/storing function 111 obtains, at given timing, information on the configuration of the servers 13, the configurations of the IP network 16 and the SAN 17, and the configuration of the storage system 15, and stores the obtained configuration information in the configuration information storing area 152 of the storage system 15.

The configuration information 40 is composed of a site identifier 401, which indicates the identifier of a site, a table pointer 402, which is used in consulting tables, a service management table 41 (FIG. 7), which shows the association relations between services and the servers 13, a server management table 42 (FIG. 8), which shows components of the servers 13 and whether the servers 13 are in use or not, a network switch management table 43 (FIG. 9), which shows the association relations between devices connected to the ports of the network switch 12 and VLANs, a storage switch management table 44 (FIG. 10), which shows the association relations between devices connected to the ports of the Fibre Channel switch 14 and zones, and a storage management table 45 (FIG. 11), which shows the association relations between the servers 13 and the logical disks of the storage system 15 accessed by the servers 13. The service management table 41 can be set by the administrator or the like.

The service management table 41 is cross-referential to the server management table 42 through server identifiers (403). The network switch management table 43, the storage switch management table 44 and the storage management table 45 are cross-referential to the server management table 42 (404).

The configuration information fetching/storing function 111 functions in the management server 21 of the secondary site 2 as well as in the management server 11 of the primary site 1, and obtains the configuration information 40 of the primary site 1 and of the secondary site 2 to store the information in the storage systems 15 and 25, respectively. The configuration information 40 is collected each time a change is made to site configuration, each time a given period of time passes, upon instruction from the administrator, or the like.

In this embodiment, the re-creation function 112 of the configuration information management facility 110 (or 210) functions in the management server 21 of the secondary site 2.

The re-creation function 112 functioning in the management server 21 of the secondary site 2 reads, upon instruction from the administrator or the like, data and the configuration information 40 of the primary site 1 out of the data storing area 251 and the configuration information storing area 252, which are in the storage system 25, to perform restoration processing for reproducing a service of the primary site 1 on the secondary site 2.

The re-creation function 112 is composed of a service selecting function 113, which is for selecting what service is to be reproduced on the secondary site 2 based on the configuration information of the secondary site 2 and the configuration information 40 of the primary site 1 that has been kept by the secondary site 2, a server selecting function 114, which is for selecting which of the servers 23 is to execute the service, a network switch setting function 115, which is for setting the configuration and the like of VLAN groups of the IP network 26, a storage switch setting function 116, which is for zoning the SAN 27, and a storage setting function 117, which is for setting the association relations between the servers 23 and the logical disks of the storage system 25 accessed by the servers 23. The re-creation function 112 reproduces a service of the primary site 1 in accordance with what computer resources are available on the secondary site 2.

Figure 6:
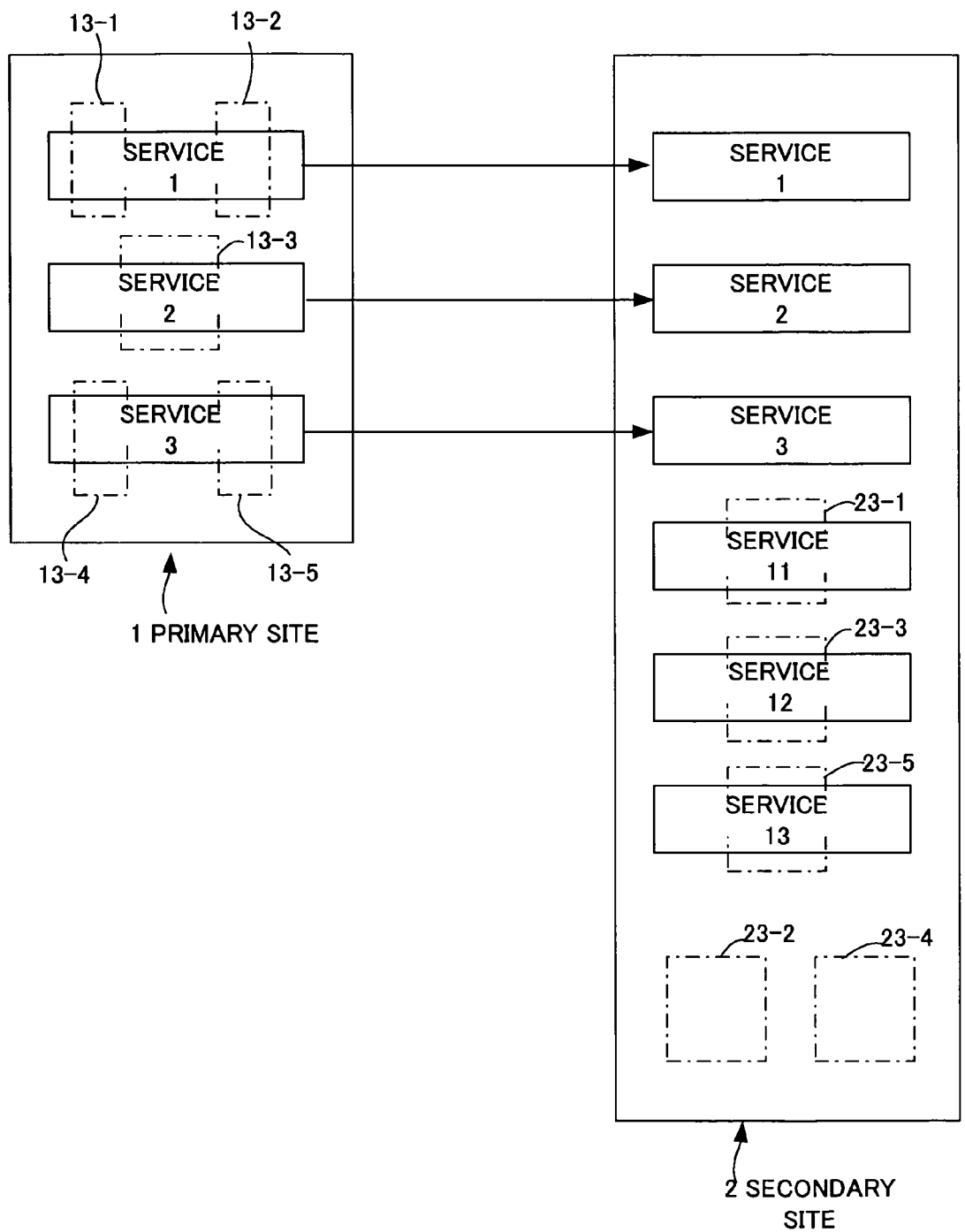
FIG. 6 is a block diagram showing the relations between services of the primary site and services of the secondary site.

Now, an example of service-server relations on the primary site 1 and the secondary site 2 according to the first embodiment is shown with reference to FIG. 6.

In FIG. 6, on the primary site 1, the servers 13-1 and 13-2 provide Service One, the server 13-3 provides Service Two, and the servers 13-4 and 13-5 provide Service Three as mentioned above.

The secondary site 2 has five servers 23-1 to 23-5. The server 23-1 provides Service Eleven, the server 23-3 provides Service Twelve, the server 23-5 provides Service Thirteen, and the servers 23-2 and 23-4 are on stand-by.

When the secondary site 2 takes over Service One to Service Three of the primary site 1 because of a failure on the primary site 1, the re-creation function 112 reproduces all of Service One to Service Three of the primary site 1 and allows the secondary site 2 to continue Service Eleven to Service Thirteen in the case where the secondary site 2 has enough computer resources available. On the other hand, in the case where not all of the services of the primary site 1 and the secondary site 2 combined cannot be executed by the computer resources of the secondary site 2, some of the services of the primary site 1 are reproduced and some of the services of the secondary site 2 are provided in accordance with a preset service priority to keep it within the ability of the computer resources available.

Described next are details of the configuration information 40, which is collected by the configuration information fetching/storing function 111 of the configuration information management facility 110 of the primary site 1 and by the configuration information management facility 210 of the secondary site 2.

FIG. 7 is an explanatory diagram showing an example of the service management table 41 of the primary site 1 when the primary site 1 is as shown in FIG. 4.

The service management table 41 is composed of the identifier 401, which indicates an identifier uniquely assigned to each site, an identifier 411, which indicates an identifier uniquely assigned to each service, a recovery priority 412, which indicates a priority level set for each service by the administrator or the like, an identifier 413, which indicates the identifiers of servers that execute services, and a recovery condition 414, which is set for each service by the administrator or the like.

The priority 412 shows an order in which Service One to Service Three are reproduced. A smaller value entered as the priority 412 means a higher priority level. Stored as the server identifier 413 is the identifier of every server that is executing a service. As the recovery condition 414, the administrator or the like sets in advance whether a service needs to be executed or not when the secondary site 2 attempts to reproduce services of the primary site 1 but does not have enough computer resources available. A service for which "recovery required" is entered as the recovery condition 414 is a service that should be reproduced or executed immediately on the secondary site, such as an essential service of the company or organization.

On the other hand, a service for which "recovery not required" is entered as the recovery condition 414 is a service that does not need to be reproduced (or executed) immediately and that can wait for when computer resources are available. Examples of such services are a monthly report service, a biannual report service, and other similar services whose temporary suspension does not cause serious damage to the company or organization activities.

The configuration information management facility 210 of the secondary site 2 too has the service management table 41 as the one shown in FIG. 7, and the priority and recovery condition 414 are set in advance for each service provided by the secondary site 2.

In the case where the secondary site 2 attempts to reproduce services of the primary site 1 but does not have enough computer resources available, the re-creation function 112 of the secondary site 2 secures necessary computer resources by halting a service for which "recovery not required" is entered as the recovery condition 414 in the service management table 41 of the secondary site 2. Thereafter, the re-creation function 112 reads the service management table 41 of the primary site 1 to execute services for which "recovery required" is entered as the recovery condition 414 in an order determined by the priority 412.

FIG. 8 shows an example of the server management table 42 of the primary site 1 when the primary site 1 is as shown in FIG. 4.

The server management table 42 is composed of the identifier 401, which indicates an identifier uniquely assigned to each site, an identifier 421, which indicates an identifier uniquely assigned to each service, a processor classification 422, which indicates the type or the like of a processor that constitutes a server, a memory column 423, which indicates the capacity of a memory a server has, a device column 424, which indicates an NIC or an FCA a server has, an IP address column 425, which indicates an IP address assigned to an NIC of a server, a storage column 426, which indicates a logical disk of a storage system that is assigned to a server, and a status 427, which indicates the current state of a server.

The processor classification 422 contains processor information from which the processing ability of a processor can be estimated, for example, CPU1, which represents a 32-bit processor, and CPU2, which represents a 64-bit processor, and the internal frequency of the processor. Other than those shown in FIG. 8, the count of processors, the capacity of the secondary cache, and the like can be entered as the processor classification 422.

The device column 424 holds information of devices related to the IP network and the SAN. The identifier and MAC address of an NIC, as well as the identifier and WWN of an FCA, are stored for each device in the device column 424. The IP address column 425 holds the identifier of an NIC and an IP address assigned to this NIC.

Stored in the storage column 426 are a number assigned to a logical disk in a storage system that is allocated to the server identified by the server identifier 421, the identifier of an FCA that accesses this logical disk, and the capacity of the logical disk.

Stored as the status 427 is information indicating whether the server is assigned to a service or not. "In use" means that the server is already assigned to a service whereas "not in use" means that the server is on stand-by.

FIG. 9 shows an example of the network switch management table 43 of the primary site 1 when the primary site 1 is as shown in FIG. 4.

The network switch management table 43 is composed of the identifier 401, which indicates an identifier uniquely assigned to each site, a network switch identifier 431, which indicates an identifier uniquely assigned to each network switch, a port number 432, which indicates a port number of a network switch, an MAC address 433, which indicates an MAC address assigned to a port number, a VLAN number (or identifier) 434, which indicates a VLAN number assigned to a port number, and a connected device 435, which indicates the MAC address of a device connected to a port that is identified by the port number 432. In a network switch of this embodiment, an MAC address (PMAC in FIG. 9) is assigned to each port number.

In FIG. 9, Switch One entered as the network switch identifier 431 represents the network switch 12-1 of FIG. 4 whereas Switch Two represents the network switch 12-2.

Figure 10:
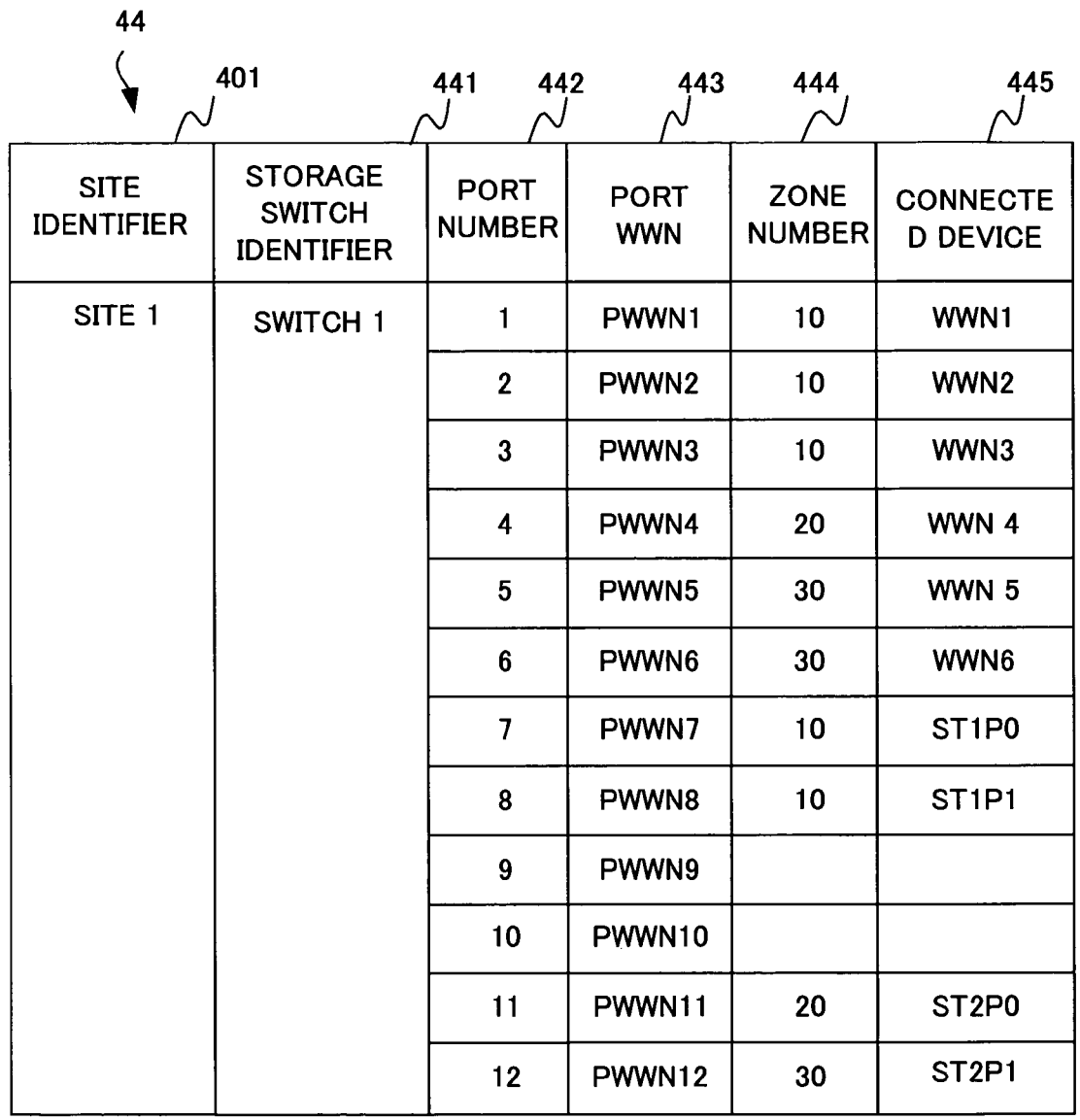
FIG. 10 is an explanatory diagram showing an example of a storage switch management table in the configuration information management facility.

FIG. 10 shows an example of the storage switch management table 44 of the primary site 1 when the primary site 1 is as shown in FIG. 4.

The storage switch management table 44 is composed of the identifier 401, which indicates an identifier uniquely assigned to each site, a Fibre Channel switch identifier 441, which indicates an identifier uniquely assigned to each Fibre Channel switch, a port number 442, which indicates a port number of a Fibre Channel switch, a WWN 443, which indicates a WWN assigned to a port number, a zone number 444, which indicates a zone number assigned to a port number, and a connected device 445, which indicates the WWN of a device connected to a port that is identified by the port number 442.

FIG. 11 shows an example of the storage management table 45 of the primary site 1 when the primary site 1 is as shown in FIG. 4.

The storage management table 45 is composed of the identifier 401, which indicates an identifier uniquely assigned to each site, a storage system identifier 451, which indicates an identifier uniquely assigned to each storage system, a server identifier 452, which indicates an identifier (WWN) of a server accessing a storage system that is identified by the server identifier 452, a disk number 453, which indicates a logical disk number assigned to a server identifier that is entered as the server identifier 452, and a copy destination 454, which indicates the identifiers and disk number of a site, a server, and a logical disk where a copy of data in a logical disk identified by the disk number 453 is stored. For example, an entry of FIG. 11 that holds as the server identifier 452 WWN1, which represents Server One (the server 13-1) of the primary site 1, shows that the logical disks LU0, LU1 and LU3 of Storage System One (the storage system 15-1) are allocated to Server One, and that data in the logical disks LU0, LU1 and LU3 is copied to the logical disks LU10 to LU13 of the storage system 25 (system identifier: 10) on the secondary site 2 (site identifier: 2). Information stored as the copy destination 454 shows the association relation between the storage system 15 of the primary site 1 and logical disks in the storage system 25 of the secondary site 2.

In FIG. 11, Storage One entered as the storage system identifier 451 represents the storage system 15-1 of FIG. 4 whereas Storage Two represents the storage system 15-2.

The storage management table 45 shows which servers 13 and 23 assigned to services are associated with which logical disks of storage systems on the primary site 1 and the primary site 2. The logical disk LU2 of the storage system 15-2 which is allocated as the configuration information storing area 152 to store the configuration information 40 of the primary site 1 is set in advance as well as the logical disk LU12 of the storage system 25 to which data in the logical disk LU2 is copied. On the secondary site 2, the configuration information 40 of the secondary site 2 is stored in logical disks that are not shown in FIG. 4.

Described above are the service management table 41, the server management table 42, the network switch management table 43, the storage switch management table 44, and the storage management table 45 that constitute the configuration information 40 of the primary site 1. The configuration information management facility 210 of the secondary site 2 too has similar tables, though not illustrated in drawings.

Figure 12:
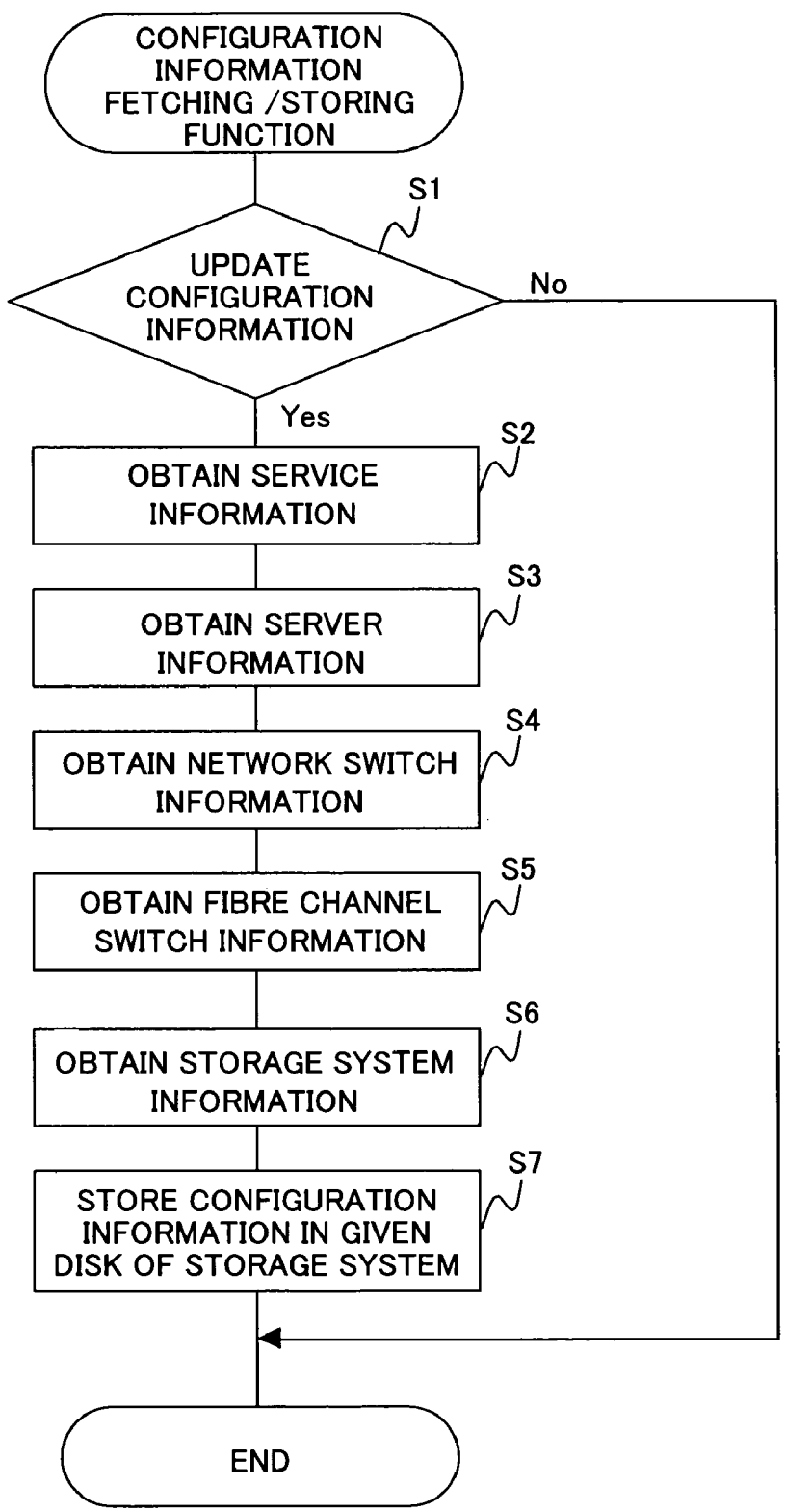
FIG. 12 is a flow chart showing an example of processing performed by a configuration information fetching/storing function of the configuration information management facility.

FIG. 12 is a flow chart showing an example of processing performed through the configuration information fetching/storing function 111 of the configuration information management facility 110 in the management server 11 on the primary site 1, or of the configuration information management facility 210 in the management server 21 on the secondary site 2. This processing is executed in regular cycles (e.g., every half hour). The description given below deals with an example of this processing on the primary site 1.

In a step S1, the management server 11 compares the configuration information 40 stored in the storage system 15 against the current site configuration. When the current configuration is inconsistent with the stored configuration information, the processing proceeds to a step S2 in order to update the configuration information 40. When there is no change in configuration, the processing is promptly ended.

In a step S2, information on services that are being executed is collected from the servers 13 to update the service management table 41.

In a step S3, the processor classification 422, the memory 423, the device 424, the IP address 425, the allocated storage system 426, and the status 427 are obtained for each server identifier of the servers 13 to update the server management table 42.

In a step S4, the network switch management table 43 is updated by obtaining the VLAN number 434 assigned to ports and the connected device 435 for each network switch identifier.

In a step S5, the storage switch management table 44 is updated by obtaining the zone number 444 assigned to ports and the connected device 445 for each storage switch identifier.

In a step S6, the storage management table 45 is updated by obtaining, for each of identifiers of the storage systems 15-1 and 15-2, the identifier 452 of the servers 13 allocated to the storage systems 15-1 and 15-2, the logical disk number 453, and the copy destination 454.

After the tables are updated, the updated tables are written in the configuration information storing area 152 of the storage system 15 in a step S7, thereby ending the processing.

The tables (configuration information) written in the configuration information storing area 152 of the storage system 15 are transferred, at given timing, to the storage system 25 of the secondary site 2 over the inter-storage network 3 by the remote copy function of the storage system 15. A copy of configuration information of the primary site 1 is thus kept on the secondary site 2. The timing at which configuration information of the primary site 1 is copied to the secondary site 2 is, for example, each time a change is made to the configuration information.

The above processing by the configuration information fetching/storing function 111 is executed also on the secondary site 2, and the configuration information 40 of the secondary site 2 is updated in a given configuration information storing area 252 of the storage system 25.

Figure 13:
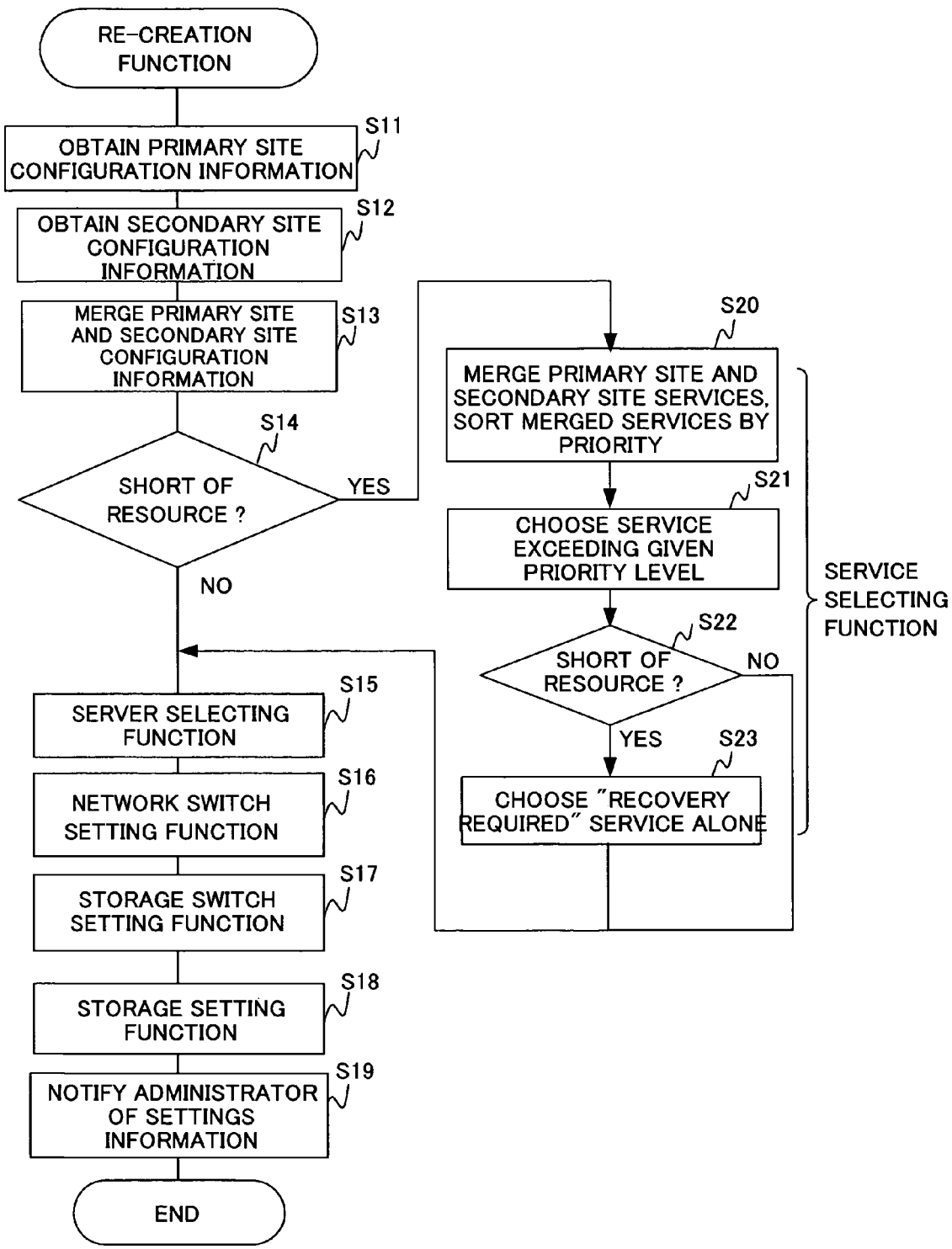
FIG. 13 is a flow chart showing an example of processing performed by a re-creation function of the configuration information management facility.

FIG. 13 is a flow chart showing an example of processing performed through the re-creation function 112 in the configuration information management facility 210 of the secondary site 2. This processing is executed upon instruction from the administrator, upon notification of a failure from the primary site 1, or the like. This embodiment describes a case in which data in the configuration information storing area 152 of the primary site 1 is backed up to the secondary site 2, and when subsequently a failure occurs in the primary site 1, the secondary site 2 takes over services of the primary site 1.

In a step S11, the management server 21 of the secondary site 2 reads the copy of the configuration information 40 of the primary site 1 out of the configuration information storing area 252 (the logical disk LU12 of FIG. 4) in the storage system 25.

Figure 14:
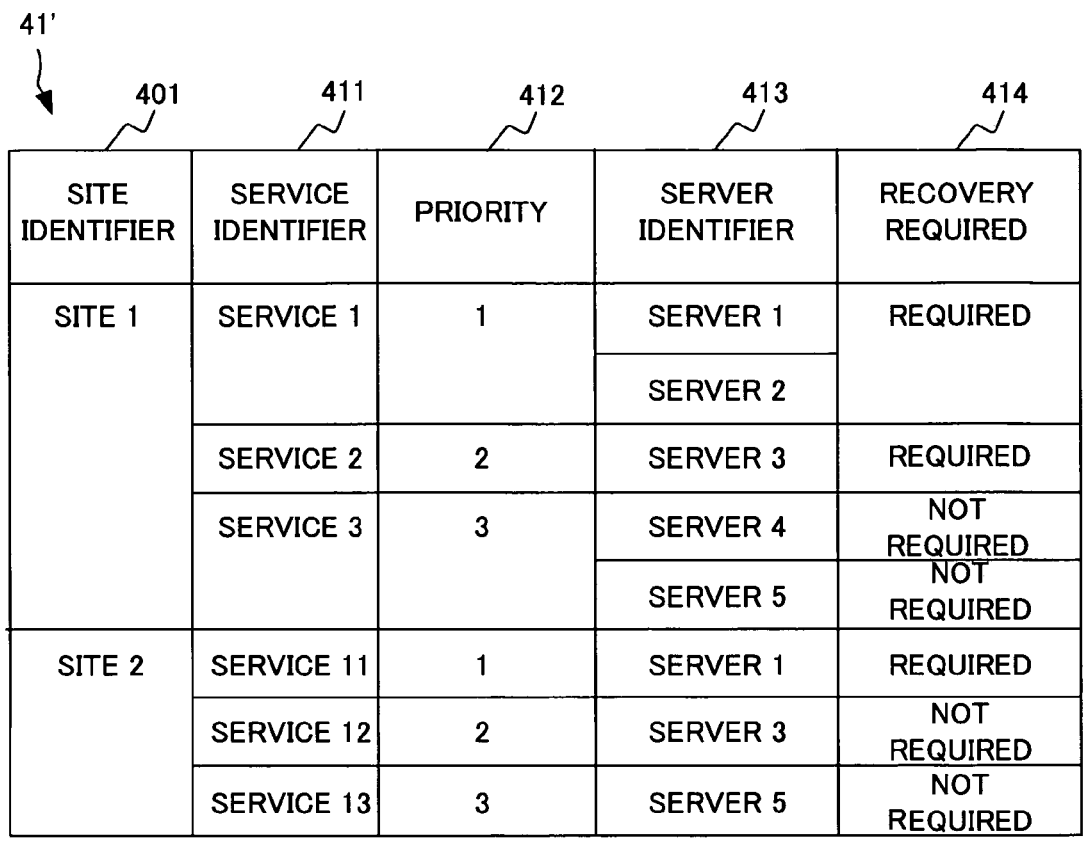
FIG. 14 is an explanatory diagram showing an example of a table obtained by compiling service management tables of the primary site and the secondary site.
Figure 15:
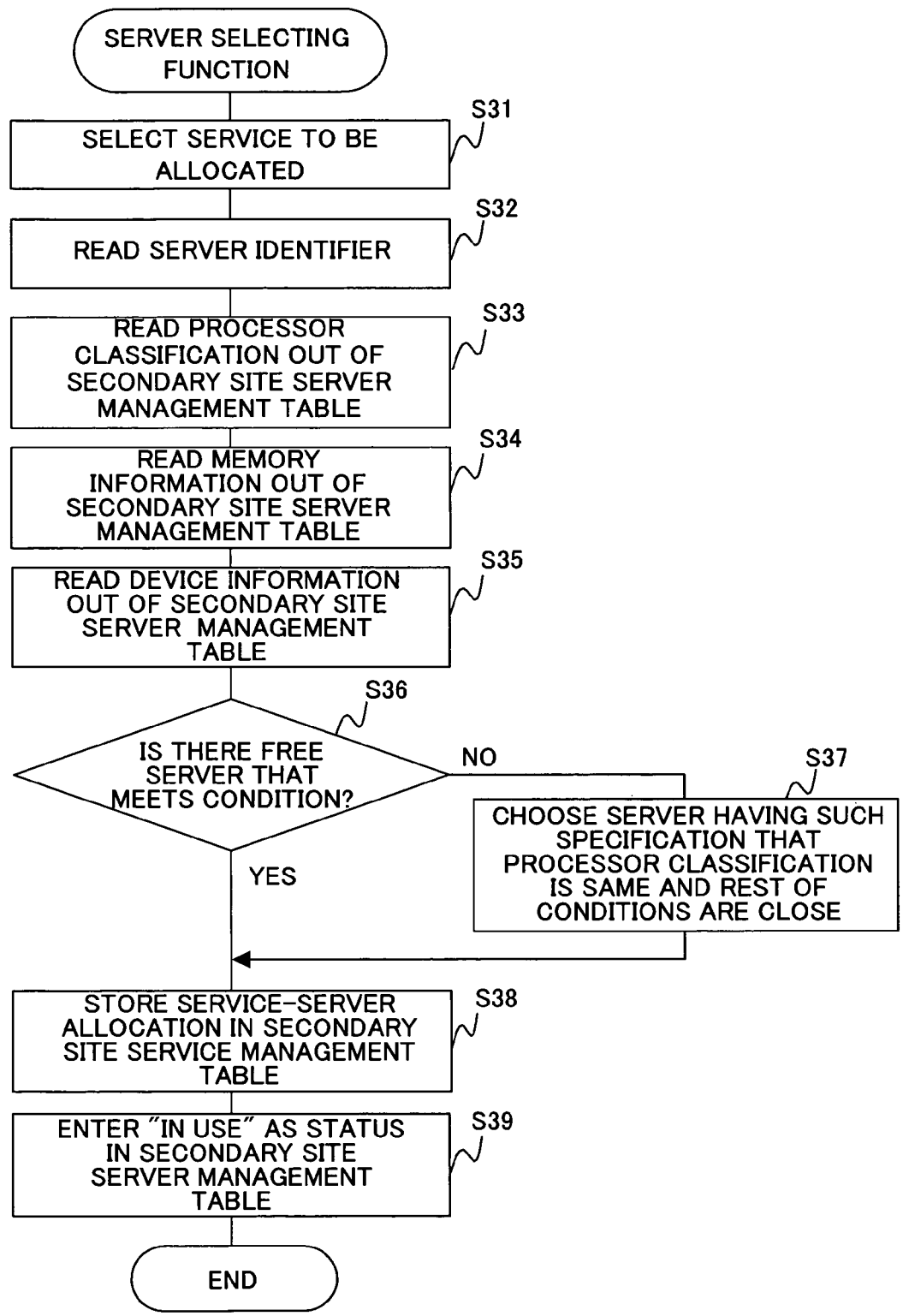
FIG. 15 is a flow chart showing an example of processing performed by a server selecting function of the configuration information management facility.

In a step S12, the configuration information 40 of the secondary site 2 is read out of the configuration information storing area 252 in the storage system 25. In a step S13, the service management table 41 in the configuration information 40 of the primary site 1 and the service management table 41 in the configuration information 40 of the secondary site 2 are compiled together. The resultant table, in which the services of the primary site 1 and the secondary site 2 shown in FIG. 6 are combined, is denoted by 41' and is shown in FIG. 14. According to the service management table 41', eight services have to be executed on two sites. The eight services are Service Eleven to Service Thirteen, which have been provided by the secondary site 2 in FIG. 6 before the secondary site 2 takes over services of the primary site 1, plus three new services added by taking over the primary site services.

In a step S14, the server management table 42 of the secondary site 2 is consulted to judge whether or not there are as many servers whose status 427 says "not in use" as the count of new services added (the services to be taken over). In other words, it is judged whether or not the count of the servers 23 that are on stand-by on the secondary site 2 is equal to or larger than the count of new services added. When there are enough servers 23 available to take over all the primary site services, the secondary site 2 is judged to have enough computer resources and the processing proceeds to a step S15. When the count of the servers 23 that are on stand-by (not in use) is smaller than the count of new services added, it is judged that there are not enough resources and the processing proceeds to a step S20.

In this embodiment, as shown in FIG. 6, the primary site 1 has five servers 13 providing Service One to Service Three whereas the secondary site 2 has three servers 23 providing three services and two servers 23 (23-2 and 23-4) on stand-by. While the secondary site 2 has to have at least three servers 23 in order to take over the services of the primary site 1, there are only two servers 23 that are on stand-by and accordingly there are not enough resources available on the secondary site 2.

In the step S20, which is the step subsequent to the step S14, when it is judged in the step S14 that there are not enough resources available, entries of the compiled service management table 41' are sorted by their priority levels. In a step S21, services that have a higher priority level than a preset priority level (e.g., 3) are chosen from the service management table 41'. The threshold priority level is set in advance by the administrator of the secondary site 2 or the like.

Of the services that have been provided by the secondary site 2, those that are not chosen in the step S21 are halted, and the status 427 in the server management table 42 is updated to "not in use" for the servers 23 that have been allocated to the services halted. The allocation of the servers 23 to the services is thus canceled.

In the example of the service management table 41' shown in FIG. 14, Service One and Service Two of the primary site 1 (site identifier: 1) and Service Eleven and Service Twelve of the secondary site 2 (site identifier: 2), four services in total, are chosen as services that exceed the given priority level, 3, as a result of the steps S20 and S21. Service Thirteen which is not chosen is halted, and the allocation of Server Five (the server 23-5) to Service Thirteen is canceled by updating the status 427 in the server management table 42 to "not in use" for the server 23-5.

In a step S22, whether there are enough resources available or not is checked by judging whether the count of unassigned servers 23 is equal to or larger than the count of the services chosen in the step S21 as ones exceeding the given priority level. In the case where necessary resources can be secured, the processing proceeds to the step S15. In the case where there are not enough resources available, the processing proceeds to a step S23.

In the step S23, since the secondary site 2 cannot handle services of two sites still after screening the services of the primary site 1 and the secondary site 2 by their priority levels, services for which "recovery required" is entered as the recovery condition (re-creation condition) 414 are chosen from the service management table 41'. Then, of the services that have been provided by the secondary site 2, those for which "recovery not required" is entered as the recovery condition 414 are halted, and the status 427 in the server management table 42 is updated to "not in use" for the servers 23 that have been allocated to the services halted. The allocation of the servers 23 to the services is thus canceled. The steps S20 to S23 correspond to the service selecting function 113 of FIG. 5.

In the example of FIGS. 14 and 6, four services are chosen and it is judged in the step S22 that the secondary site 2 equipped with five servers 23-1 to 23-5 has enough resources. The processing therefore proceeds to the step S15.

In the step S15, the server selecting function 114 is executed to assign the services chosen in the step S13 or S23 to the servers 23 of the secondary site 2.

A description will be given with reference to a flow chart of FIG. 5 on an example of how the server selecting function 114 is executed in the step S15. In a step S31, the site identifiers are read to designate, one at a time, services of the primary site 1 out of the services selected in the steps S13 to S23. In a step S32, performance information of a server that has been allocated to the designated service is read. Server identifiers of the chosen servers are read out of the service management table 41' of FIG. 14, and the server management table 42 of the primary site 1 is read out of the configuration information storing area 252 to read the processor classification 422, the memory 423, and the device 424 in entries of the read server identifiers.

In steps S33 to S35, the servers 23 for which "not in use" is entered as the status 427 (free servers) are extracted from the server management table 42 of the secondary site 2, and then the processor classification 422, the memory 423, and the device 424 are read.

In a step S36, whether or not there is a server that has been assigned to a chosen service and whose performance information (condition) matches that of a free server on the secondary site 2. When there are the servers 23 that meet the condition, the processing proceeds to a step S38. When there are no servers 23 that meet the condition, the processing proceeds to a step S37.

In the step S37, a free server is chosen that has the same processor classification 422 as and the closest performance information to the servers 13 that have been assigned to a chosen service on the primary site 1. In this step, free servers may be chosen in a descending order.

In a step S38, the service of the primary site 1 that is designated in the step S31 is added to the service management table 41 of the secondary site 2. In a step S39, the status 427 is updated to "in use" for the free server chosen.

The server selecting function 114 of the management server 21 reads, out of the image storing area 253, a copy of software (boot images of OSs, applications and the like) used for the services of the primary site 1, and the servers 23 are allocated by performing the processing of the steps S31 to S39 on every service of the primary site 1 that is chosen from the service management table 41' of FIG. 14 one service at a time. Then the processing returns to a step S16 of FIG. 13.

The service-server allocation in the service management table 41' of FIG. 14 will be described with reference to FIG. 16.

In the case where Service One, Service Two, Service Eleven and Service Twelve, which exceed the given priority level, are chosen, the only servers that are in use (the status 427) in the server management table 42 of the secondary site 2 are Server One (the server 23-1) and Server Three (the server 23-3) whereas the rest of the servers, Server Two (the server 23-2), Server Four (the server 23-4) and Server Five (the server 23-5) are free servers.

Of the services of the primary site 1 that are decided to be taken over by the secondary site 2, Service One is associated with server identifiers 1 and 2. A secondary site server that is to take over Service One is requested to meet such conditions that the processor classification 422 is "CPU1", which is associated with the server identifications 1 and 2 in the server management table 42 of FIG. 8, and that the memory 423 is "2 GB", which is associated with the server identifier 2 in FIG. 8. The server management table 42 of the secondary site 2 is shown on the right hand side of FIG. 16, and the table is searched for the processor classification 422 starting from the top of the drawing toward the bottom of the drawing. The search reveals that a server of the secondary site 2 whose processor classification 422 meets the condition is Server Three (the server 23-3, server identification: 3). Accordingly, Server Three (the server 23-3) is assigned as a server that takes over Service One, the entry is added to the service management table 41 of the secondary site 2, and the status 427 for Server Three (the server 23-3) is updated to "in use" in the server management table 42.

A secondary site server that is to take over Service Two is chosen as follows:

Server Three (the server 13-3) that has been assigned to Service Two on the primary site 1 has "CPU2" as the processor classification 422 and "4 GB" as the memory 423. From the server management table 42 of the secondary site 2, free servers whose processor classification 422 is CPU2 are extracted, and Server Five (the server 23-5) is chosen as one having a larger memory 423 than other extracted free servers. The thus chosen Server Five (the server 23-5) is assigned to Service Two, and the management tables are updated accordingly.

Through the above processing, despite the fact that the primary site 1 and the secondary site 2 have different server configurations and provide separate services independent of each other, formerly engaged servers are freed and assigned to services to be taken over by the secondary site 2 so that as many high priority services as can be handled with resources of the secondary site 2 are executed.

Figure 17:
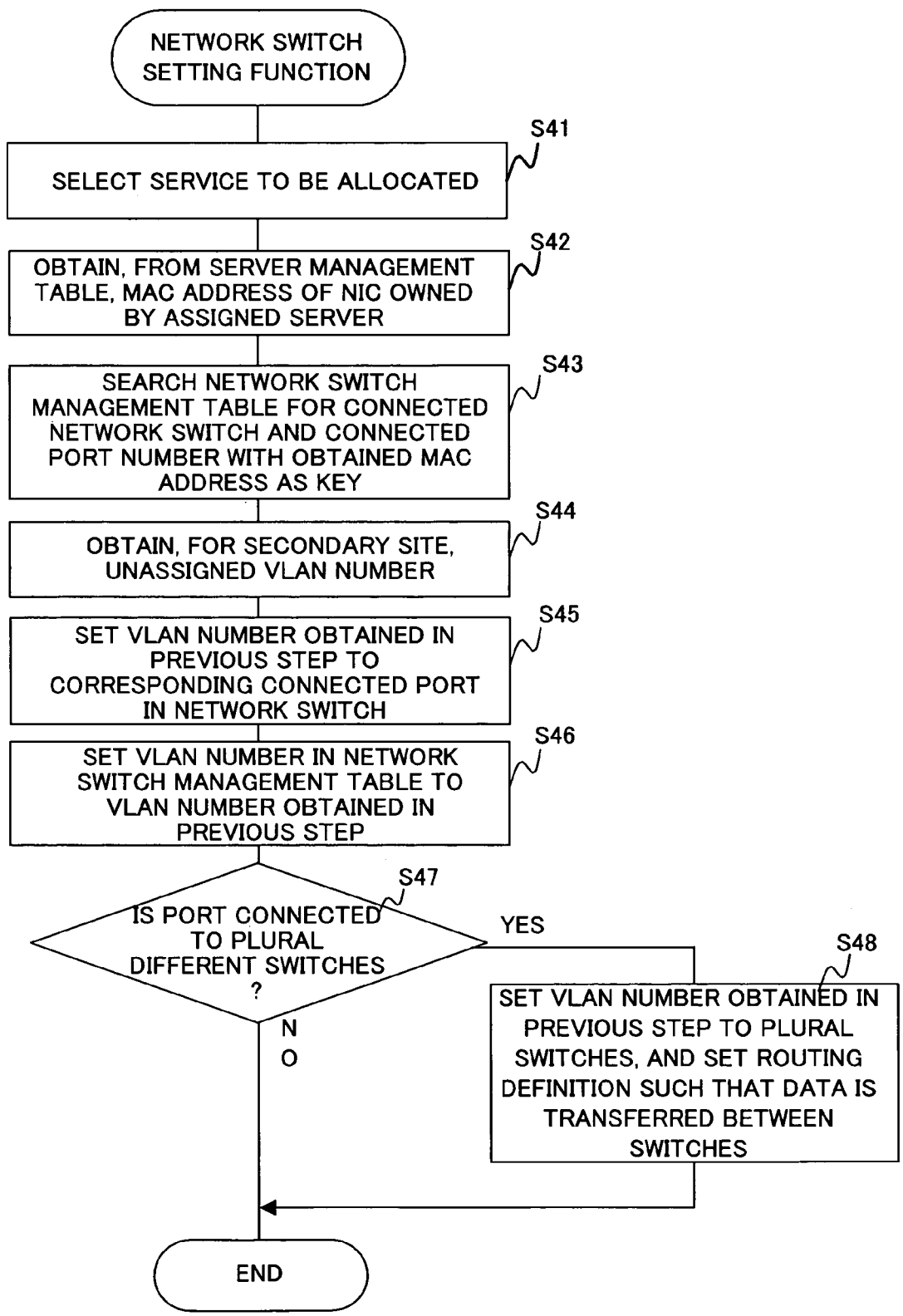
FIG. 17 is a flow chart showing an example of processing performed by a network switch setting function of the configuration information management facility.

After the server selecting function 114 finishes the step S15, the processing moves on to the step S16 of FIG. 13 to execute the network switch setting function 115. Details of the network switch setting function 115 will be described below with reference to FIG. 17.

In a step S41, a service of the primary site 1 is designated out of the services selected in the steps S13 to S23.

In a step S42, one of the servers 23 of the secondary site 2 that is assigned to the designated service of the primary site 1 is chosen, and the MAC address of the chosen one of the servers 23 is obtained from the device column 424 in the server management table 42 of FIG. 8.

In a step S43, the network switch management table 43 (FIG. 9) of the secondary site 2 is searched for a network switch and a port that are associated with the MAC address obtained in the step S42.

In a step S44, of VLAN numbers used for the services of the primary site 1 that are taken over by the secondary site 2, a VLAN number that is not allocated to the secondary site 2 is obtained from the network switch management table 43 of the secondary site 2.

In a step S45, the VLAN number obtained in the step S44 is allocated to the port found as a result of the search of the step S43. In a step S46, the VLAN number allocated in the step S45 is set in the network switch management table 43 of the secondary site 2.

In a step S47, it is judged whether or not the port found in the step S43 is connected to plural different network switches 12. When the port is connected to plural different network switches 12, the VLAN number set in the step S46 is allocated to a path of the found port, and a routing definition is set in a manner that allows the network switches to communicate with each other. Then the network switch management table 43 of the secondary site 2 is updated and the processing is ended.

The processing of the steps S41 to S48 is executed, one server at a time, for all of the servers 23 that are assigned to any one of services to be newly allocated on the secondary site 2.

Through the above processing, ports of the network switch 12 connected to the servers 23 that execute services taken over by the secondary site 2 are detected from the MAC addresses that the devices of these servers 23 have. Then VLAN numbers (or VLAN-IDs) associated with the detected ports are obtained from the network switch management table 43, and the VLAN numbers are set such that VLAN numbers used on the primary site 1 for the services taken over do not overlap with the VLAN settings of the IP network 26 on the secondary site 2.

In the case where VLAN number, or VLAN-ID, settings differ between the IP network 16 of the primary site 1 and the IP network 26 of the secondary site 2, the secondary site 2 may use the exact VLAN numbers that are used on the primary site 1.

The servers 23 are allocated by performing, one service at a time, processing of the steps S41 to S48 for every service of the primary site 1 that is chosen from the service management table 41' of FIG. 14. Then the processing returns to the step S16 of FIG. 13.

The processing of the steps S31 to S39 is performed as follows for the server-service allocation in the service management table 41' of FIG. 14.

Figure 16:
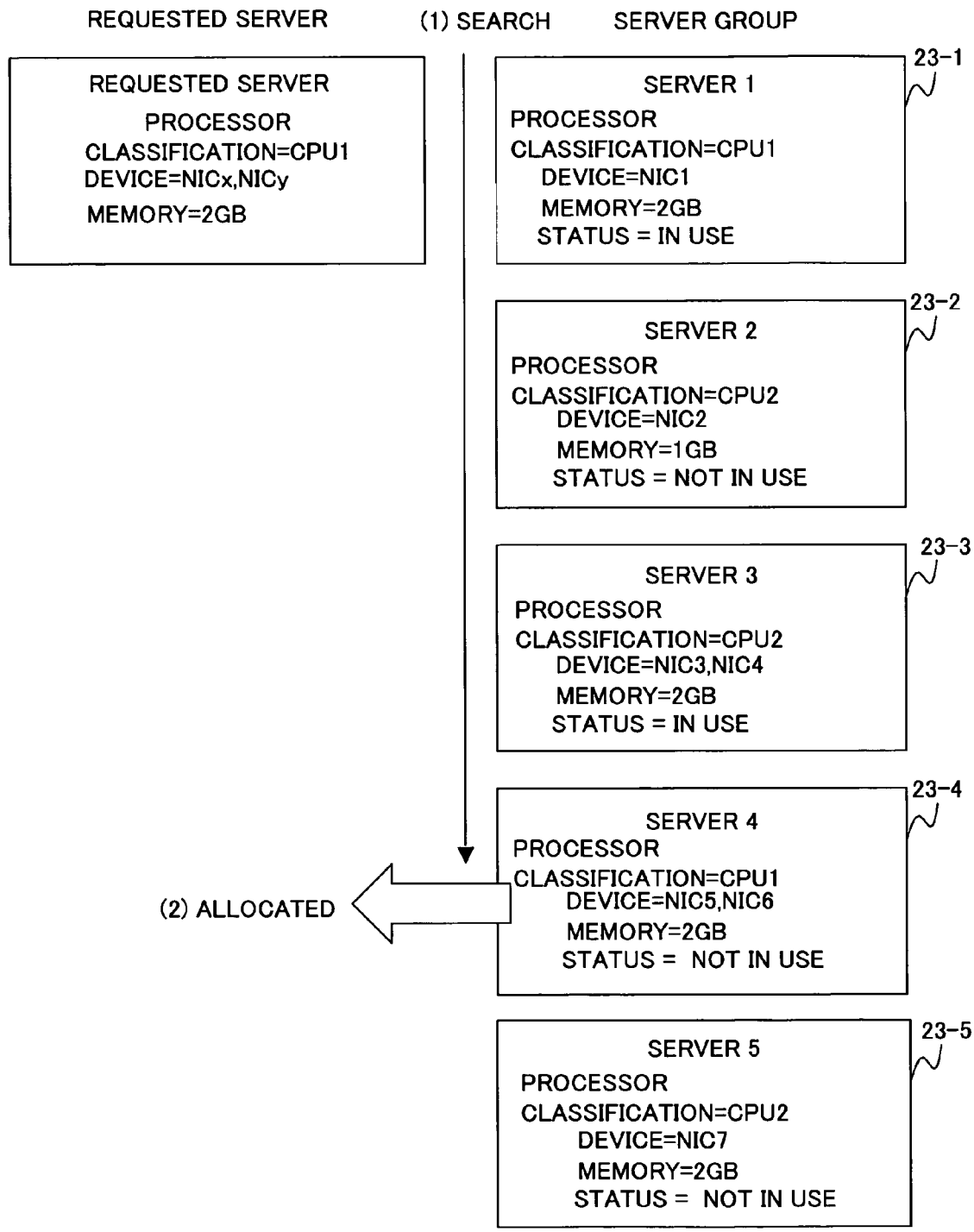
FIG. 16 is an explanatory diagram showing how a server is selected.

In the service management table 41' of FIG. 14, when Service One and Service Two of the primary site 1 are to be taken over by the secondary site 2 and Service Eleven and Service Twelve of the secondary site 2 are to be continued, the server 23-4 assigned to Service One as shown in FIG. 16 has NIC5 and NIC6. From the MAC addresses of NIC5 and NIC6, numbers assigned to ports of the network switch 22 that are connected to the server 23-4 are obtained to obtain an allocated VLAN number.

The VLAN number associated with NIC5 and NIC6 is compared against the VLAN number 10, which has been allocated on the primary site 1 to Service One. When the former and the latter do not overlap, the VLAN number 10, which has been allocated on the primary site 1 to Service One, is set to the network switch 22 of the secondary site 2. On the other hand, when the VLAN number associated with NIC5 and NIC6 matches the VLAN number 10, which has been allocated on the primary site 1 to Service One, a new VLAN number that is not the VLAN number 10 is obtained and set to the network switch 22.

In reproducing the configuration of the IP network 16 of the primary site 1, the network switch setting function 115 sets the network switch 22 as described above, so that VLAN numbers do not overlap and so that the environment of the IP network 26 for the server 23-4 that takes over Service One of the primary site 1 is as close as possible to the environment on the primary site 1.

Figure 18:
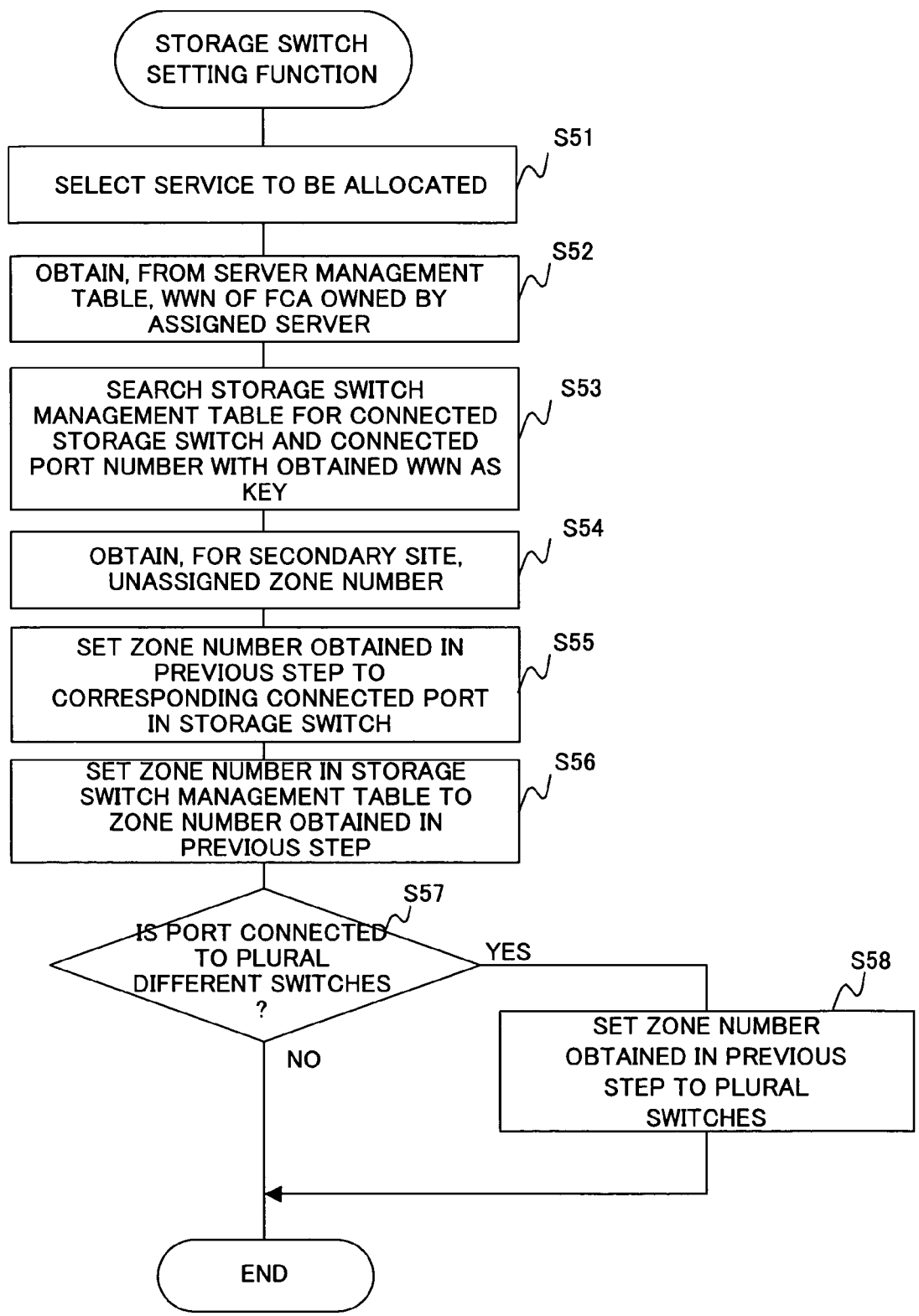
FIG. 18 is a flow chart showing an example of processing performed by a storage switch setting function of the configuration information management facility.

After the network switch setting function 115 finishes the step S16, the processing moves on to a step S17 of FIG. 13 to execute the storage switch setting function 116. Details of the storage switch setting function 116 will be described below with reference to FIG. 18.

In a step S51, a service of the primary site 1 is designated out of the services selected in the steps S13 to S23.

In a step S52, one of the servers 23 of the secondary site 2 that is assigned to the designated service of the primary site 1 is chosen, and the WWN of the chosen one of the servers 23 is obtained from the device column 424 in the server management table 42 of FIG. 8.

In a step S53, the storage switch management table 44 (FIG. 10) of the secondary site 2 is searched for the Fibre Channel switch 14 and a port that are associated with the WWN obtained in the step S52.

In a step S54, of zone numbers used for the services of the primary site 1 that are taken over by the secondary site 2, a zone number that is not allocated to the secondary site 2 is obtained from the storage switch management table 44 of the secondary site 2.

In a step S55, the zone number obtained in the step S54 is allocated to the port found as a result of the search of the step S53. In a step S56, the zone number allocated in the step S55 is set in the storage switch management table 44 of the secondary site 2.

In a step S57, it is judged whether or not the port found in the step S53 is connected to plural different Fibre Channel switches 14. When the port is connected to plural different Fibre Channel switches 14, the zone number set in the step S56 is allocated to a path of the found port. Then the storage switch management table 44 of the secondary site 2 is updated and the processing is ended.

The processing of the steps S51 to S58 is executed, one server at a time, for all of the servers 23 that are assigned to any one of services to be newly allocated on the secondary site 2.

Through the above processing, ports of the Fibre Channel switch 14 connected to the servers 23 that execute services taken over by the secondary site 2 are detected from the WWNs that the devices of the servers 23 have. Then zone numbers (or zone identifiers) associated with the detected ports are obtained from the storage switch management table 44, and the zone numbers are set such that zone numbers used on the primary site 1 for the services taken over do not overlap with the zone numbers of the SAN 17 on the secondary site 2.

In the case where zone number settings differ between the SAN 17 of the primary site 1 and the SAN 27 of the secondary site 2, the secondary site 2 may use the exact zone numbers that are used on the primary site 1.

The processing of the steps S51 to S58 is performed as follows for the server-service allocation in the service management table 41' of FIG. 14.

In the service management table 41' of FIG. 14, when Service One and Service Two of the primary site 1 are to be taken over by the secondary site 2 and Service Eleven and Service Twelve of the secondary site 2 are to be continued, the server 23-4 assigned to Service One as shown in FIG. 16 has FCAs (not shown). From the WWNs of these FCAs, numbers assigned to ports of the SAN 27 that are connected to the server 23-4 are obtained to obtain an allocated zone number.

The zone number associated with the FCAs of the server 23-4 is compared against the zone number 10, which has been allocated on the primary site 1 to Service One. When the former and the latter do not overlap, the zone number 10, which has been allocated on the primary site 1 to Service One, is set to the Fibre Channel switch 24 of the secondary site 2. On the other hand, when the zone number associated with the FCAs of the server 23-4 matches the zone number 10, which has been allocated on the primary site 1 to Service One, a new zone number that is not the zone number 10 is obtained and set to the Fibre Channel switch 24.

In reproducing the configuration of the SAN 17 of the primary site 1, the storage switch setting function 116 sets the Fibre Channel switch 24 as described above, so that zone numbers do not overlap and so that the environment of the SAN 27 for the server 23-4 that takes over Service One of the primary site 1 is as close as possible to the environment on the primary site 1.

Figure 19:
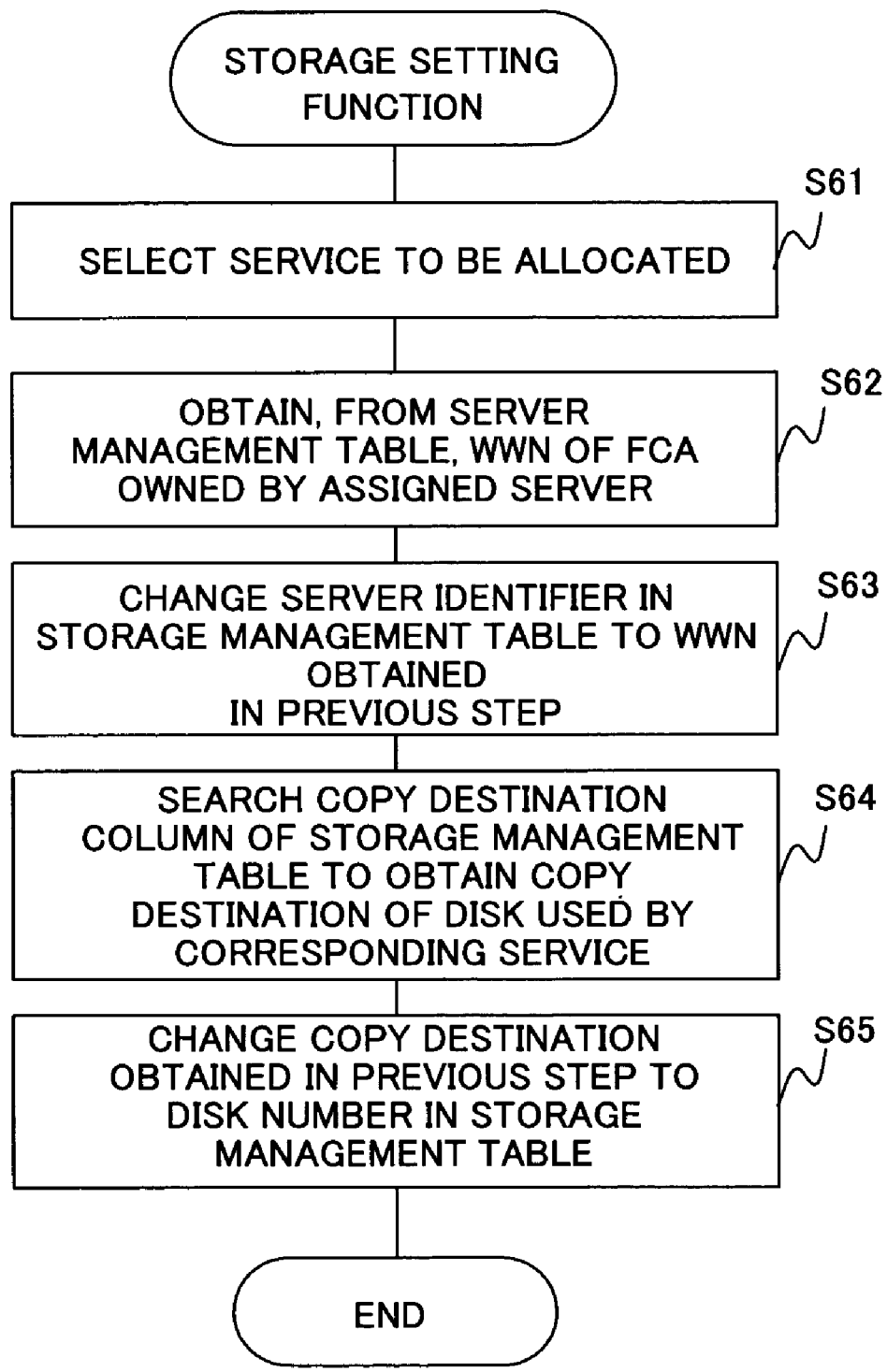
FIG. 19 is a flow chart showing an example of processing performed by a storage setting function of the configuration information management facility.

After the storage switch setting function 116 finishes the step S17, the processing moves on to a step S18 of FIG. 13 to execute the storage setting function 117. Details of the storage setting function 117 will be described below with reference to FIG. 19.

In a step S61, a service of the primary site 1 is designated out of the services selected in the steps S13 to S23.

In a step S62, one of the servers 23 of the secondary site 2 that is assigned to the designated service of the primary site 1 is chosen, and a WWN assigned to the FCA 133 of the chosen one of the servers 23 is obtained from the device column 424 in the server management table 42 of FIG. 8.

In a step S63, the service management table 41 and storage management table 45 of the primary site 1 are read out of a copy of the configuration information 40 of the primary site 1 which has been backed up to the configuration information storing area 252 of the secondary site 2. The read tables are consulted to obtain, from the column of the copy destination 454, a site identifier and a system identifier that are associated with a logical disk used on the primary site 1 for the service designated in the step S61.

When the obtained site identifier indicates the secondary site 2 (site identifier: 2), the storage system 25 that is identified by the obtained system identifier is chosen. The WWN obtained in the step S62 is set in the column of the server identifier 452 of an entry for the chosen storage system 25 in the storage management table 45 of the secondary site 2. In the case where the storage management table 45 of the secondary site 2 does not have an entry for the storage system 25 that is chosen, a new entry is added to the table to set the system identifier and the server identifier.

In a step S64, a system identifier and a disk number that are associated with a logical disk used on the primary site 1 for the service designated in the step S61 are obtained from the column of the copy destination 454 in (the copy of) the storage management table 45 of the primary site 1 which is read in the step S63.

In a step S65, every disk number obtained in the step S64 is set as the disk number 454 that is associated with the server identifier 452 set in the step S63.

The processing of the steps S61 to S65 is executed, one server at a time, for all of the servers 23 that are assigned to any one of services to be newly allocated on the secondary site 2.

Through the above processing, logical disks of the storage system 25 to which data of the primary site 1 has been backed up are allocated to the servers 23 that execute services taken over by the secondary site 2.

After the storage setting function 117 finishes the step S18, the processing moves on to a step S19 of FIG. 13. Now that the reconfiguration of the secondary site 2 is completed through the processing of the steps S20 to S23 and S15 to S18, the administrator of the secondary site 2 is notified in the step S19 of the information set in the tables (settings information). The notification is made by sending the settings information to, for example, a management terminal connected to the IP network 26 of the secondary site 2.

The processing of the steps S61 to S65 is performed as follows for the server-service allocation in the service management table 41' of FIG. 14.

In the service management table 41' of FIG. 14, when Service One and Service Two of the primary site 1 are to be taken over by the secondary site 2 and Service Eleven and Service Twelve of the secondary site 2 are to be continued, the logical disks LU10, LU11 and LU13, to which data of Service One stored in a logical disk of the primary site 1 is copied, are allocated as shown in FIG. 11 to the server 23-4 assigned to Service One as shown in FIG. 16.

As has been described, the configuration information management facility 110 of the primary site 1 detects, in regular cycles, the configuration of the primary site 1 to update the configuration information 40 and store the updated configuration information 40 in the configuration information storing area 152. Data of services performed by the servers 13 of the primary site 1 is stored in the data storing area 151, and software executed by the servers 13 is stored as a boot image in the image storing area 153. The storage system 15 of the primary site 1 uses a remote copy function to copy data in the data storing area 151, the configuration information storing area 152 and the image storing area 153 on the primary site 1 to the data storing area 251, the configuration information storing area 252, and the image storing area 253 on the secondary site 2, respectively.

When a failure occurs in the primary site 1, the administrator or the like activates the re-creation function 112 from the configuration information management facility 210 of the management server 21 on the secondary site 2.

The re-creation function 112 allows the secondary site 2 to take over Service One to Service Three of the primary site 1 all when the secondary site 2 has enough resources available. In the case where the secondary site 2 does not have enough resources available to take over all of the services of the primary site 1 while continuing providing its own services, Service Eleven to Service Thirteen, the service management table 41 of the primary site 1 read out of the configuration information storing area 252 and the service management table 41 of the secondary site 2 are compiled together. The compiled table, namely, the service management table 41', is consulted to find services that exceed a given priority level, and only these services are taken over by the secondary site 2.

In the case where the available resources are not enough still after the screening of services by their priority levels, the service management table 41' is searched for services for which "recovery required" is entered as the recovery condition 414, and these services are taken over first. The services thus chosen to be taken over by the secondary site 2 are allocated to free resources of the secondary site 2 that are secured by halting some of the services of the secondary site 2. In this way, the optimum reconfiguration is achieved with the limited resources of the secondary site 2.

The data storing area 251, which keeps a copy of data in the data storing area 151 of the primary site 1, is allocated to the servers 23 that take over services of the primary site 1. Then the servers 23 are booted with boot images in the image storing area 253, and services of the primary site 1 are thus resumed on the secondary site 2.

This embodiment employs remote copy in copying data and boot images, but it does not always have to be remote copy. Instead of remote copy, a copying server may be prepared to copy given data and images, for example. Primary site configuration information, which in this embodiment is stored in a storage system before being copied to the secondary site 2 by remote copy, may instead be transferred directly from the configuration information management facility 110 of the primary site 1 to the configuration information management facility 210 of the secondary site 2 over an inter-site network or the like.

Thus, in the first embodiment, the remote copy function of the storage system 15 on the primary site 1 is utilized to transfer primary site's data, configuration information 40, and boot images to the secondary site 2 in advance, so that the primary site 1 can be quickly reproduced on the secondary site 2 from the transferred copy of the configuration information 40 in site recovery.

A change in configuration of the servers 13, the storage system 15, the IP network 16, and the SAN 17 on the primary site 1 does not cause the secondary site 2 to fail to thereby always reproduce the latest configuration of the primary site 1 since the latest version of the configuration information 40 of the primary site 1 is kept transferred to the secondary site 2 through the remote copy function of the storage system 15. The primary site 1 can be reproduced automatically unlike the above-described examples of prior art where human intervention is necessary, and therefore the secondary site 2 can be reconfigured very quickly. In application to recovery from disaster, in particular, the secondary site 2 can take over the primary site 1 within a very short period of time, which shortens the service interruption period significantly and minimizes the damage to the company or organization.

Second Embodiment

Figure 20:
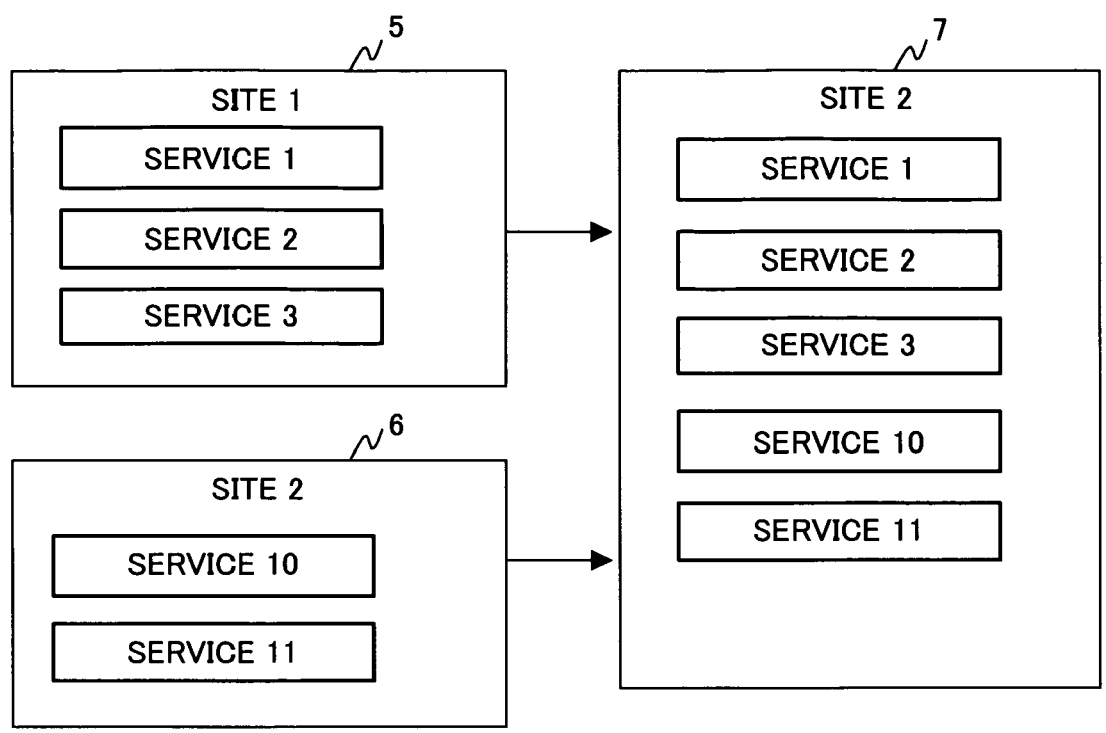
FIG. 20 is a block diagram showing the relations between services and computer systems on which server integration is performed according to a second embodiment of this invention.

FIG. 20 is a system configuration diagram according to a second embodiment of this invention as applied to server consolidation (server integration).

Shown in FIG. 20 is an example of integrating old computer systems on Site One (denoted by 5 in the drawing) and Site Two (denoted by 6 in the drawing) into a new computer system on Site Three.

Site One provides Service One to Service Three whereas Site Two provides Service Ten and Service Eleven. On Site One and Site Two each, the configuration information fetching/storing function 111 updates the configuration information 40 of the site in the storage system 15. As in the first embodiment, the storage system 15 of Site One and the storage system 15 of Site Two respectively use remote copy to store and update copies of their sites' data, configuration information 40, and boot images in the storage system 25 of Site Three.

At the start of the server integration, the re-creation function 112 of the configuration information management facility 210 is activated in the management server 21 of Site Three to reproduce Site One and Site Two on Site Three from the copied configuration information 40 of Site One and the copied configuration information 40 of Site Two.

The re-creation function 112 compiles together the service management table 41 of Site One and the service management table 41 of Site Two to obtain the service management table 41' as in the first embodiment. In the manner described in the first embodiment, resources of Site Three are assigned to Service One to Service Three and Service Ten and Service Eleven in accordance with how many resources are available on Site Three.

Since the services are allocated to the resources in the same manner as described in the first embodiment, redundant descriptions are omitted. The difference between the first embodiment and the second embodiment is that Site Three into which other sites are integrated does not have its own service to provide and to be halted before the allocation.

In the case where new Site Three has enough resources available, all services of Site One and Site Two are taken over by Site Three. In the case where Site Three does not have enough resources available, services are allocated to resources in the order of priority written in the service management table 41'. If there are still not enough resources available, services for which "recovery required" is entered as the recovery condition 414 are extracted from the service management table 41' to be taken over by Site Three first.

The above processing enables Site Three to reproduce and integrate Site One and Site Two as soon as data, the configuration information 40, and boot images of Site One and Site Two, which hold old computer systems, finish being transferred to the storage system 25 of Site Three through remote copy by the storage system 15 of each of the old sites.

This embodiment employs remote copy in copying data and boot images, but it does not always have to be remote copy. Instead of remote copy, a copying server may be prepared to copy given data and images, for example.

As in the first embodiment, servers can automatically be integrated by the re-creation function 112 of Site Three without needing the administrator to have detailed knowledge about the configuration of Site One and Site Two. Thus, the enormous amount of labor and time required in conventional server integration is cut down greatly and a new computer system can start operating in significantly less time after introduction.

Third Embodiment

FIGS. 21 to 25 show a third embodiment of this invention in which a server partitioning function is added to the service selecting function 113 of the first embodiment. The rest of the third embodiment is configured the same way as the first embodiment.

In the third embodiment, when the secondary site 2 does not have enough resources to assign to services for which "recovery required" is entered as the recovery condition 414, the service selecting function 113 of the re-creation function 112 creates plural virtual servers by logical partitioning of a server, or creates plural virtual computers in a server, so that services for which "recovery required" is entered as the recovery condition 414 are allocated to resources of the secondary site 2 and essential services are resumed.

Figure 21:
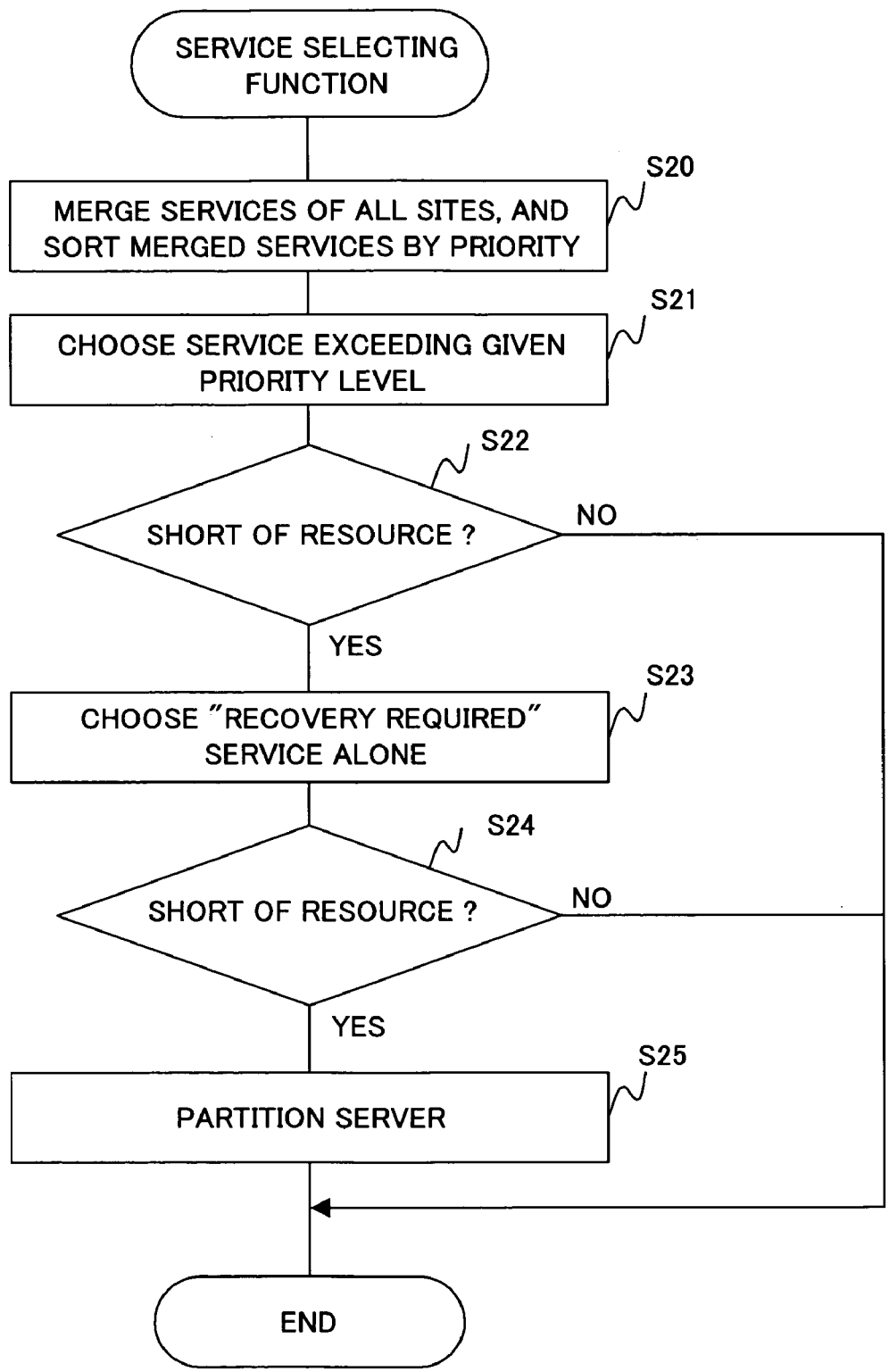
FIG. 21 is a flow chart showing an example of processing performed by a service selecting function of a configuration information management facility according to a third embodiment of this invention.

In FIG. 21, the service selecting function 113 described in the first embodiment with reference to the steps S20 to S23 of the flow chart of FIG. 13 is a sub-routine, and a server partitioning function is newly added.

Steps S20 to S23 of FIG. 21 are the same as those of FIG. 13 described in the first embodiment, and the management server 21 of the secondary site 2 reads the service management table 41 of the primary site 1 out of the storage system 25 to combine the read table with the service management table 41 of the secondary site 2 and obtain the service management table 41' shown in FIG. 14.

Since it is judged in the step S14 of FIG. 13 that the secondary site 2 does not have enough resources available, services in the compiled service management table 41' are sorted by their priority to choose, in the step S21, services that exceed a preset priority level (3, for example).

In the step S22, it is judged whether or not there are enough resources to execute services chosen according to their priority levels. When the secondary site 2 does not have enough resources available, the processing proceeds to the step S23, where services for which "recovery required" is entered as the recovery condition 414 are chosen first.

On the other hand, when it is judged in the step S22 that there are enough resources available, services that are not chosen in the step S21 are halted and the status 427 in the server management table 42 is updated to "not in use" for the servers 23 that have been assigned to the services halted. The allocation of the servers 23 to the services is thus canceled. Thereafter, the sub-routine is ended and the processing moves on to the step S15 (the server selecting function) of FIG. 13.

In a step S24, it is judged whether or not the secondary site 2 has enough resources to execute services for which "recovery required" is entered as the recovery condition 414. When there are enough resources available, services for which "recovery not required" is entered as the recovery condition 414 are halted and the status 427 in the server management table 42 is updated to "not in use" for the servers 23 that have been assigned to the services halted. The allocation of the servers 23 to the services is thus canceled. Thereafter, the sub-routine is ended.

On the other hand, when the secondary site 2 does not have enough resources to assign to services for which "recovery required" is entered as the recovery condition 414, the processing proceeds to a step S25, where a server is partitioned. After necessary resources are secured by the server partitioning in the step S25, the sub-routine is ended.

Figure 22:
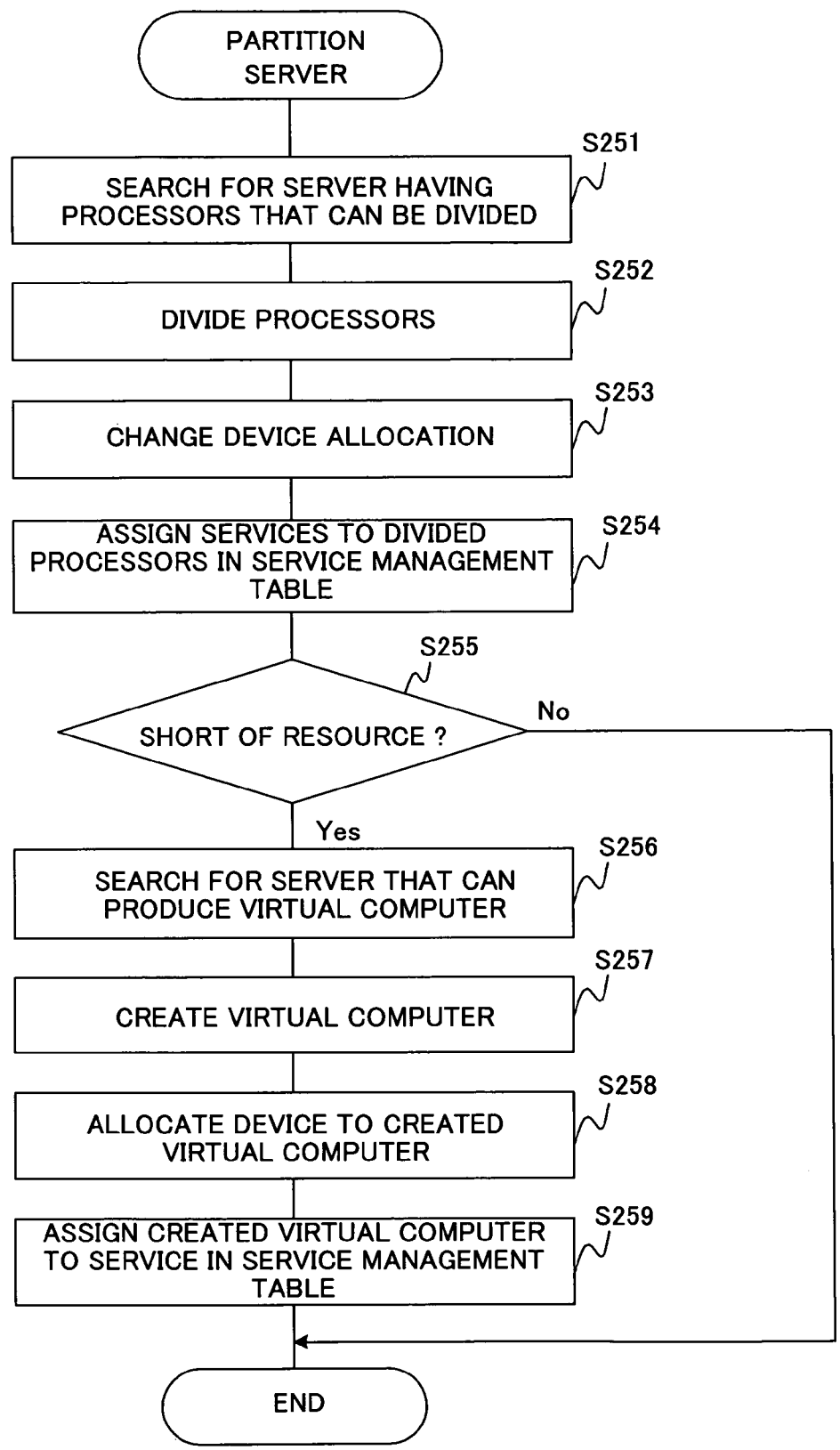
FIG. 22 is a flow chart showing an example of processing performed by a server partitioning function of a service selecting function according to the third embodiment.

FIG. 22 is a flow chart of the server partitioning function executed in the step S25 of FIG. 21.

Prior to the server partitioning, services for which "recovery not required" is entered as the recovery condition 414 are halted, and the status 427 in the server management table 42 is updated to "not in use" for the servers 23 that have been assigned to the services halted, to thereby cancel the allocation of the servers 23 to the services.

In a step S251, the server management table 42 is searched for free servers whose status 427 is "not in use" to choose the servers 23 whose processors can be divided for logical partitioning (LPAR). In other words, a free server is checked for whether it has plural processors, and the servers 23 that have plural processors (or processor cores) each are chosen to be logically partitioned.

In a step S252, logical sections are set in a chosen server in accordance with how many processors the server has, and the processors are divided (logical partitioning). The count of logical sections is set in advance in accordance with the count of processors. For example, when a server has four processors or less, two logical sections are set in the server and, when there are eight processors, four logical sections are set.

Figure 23:
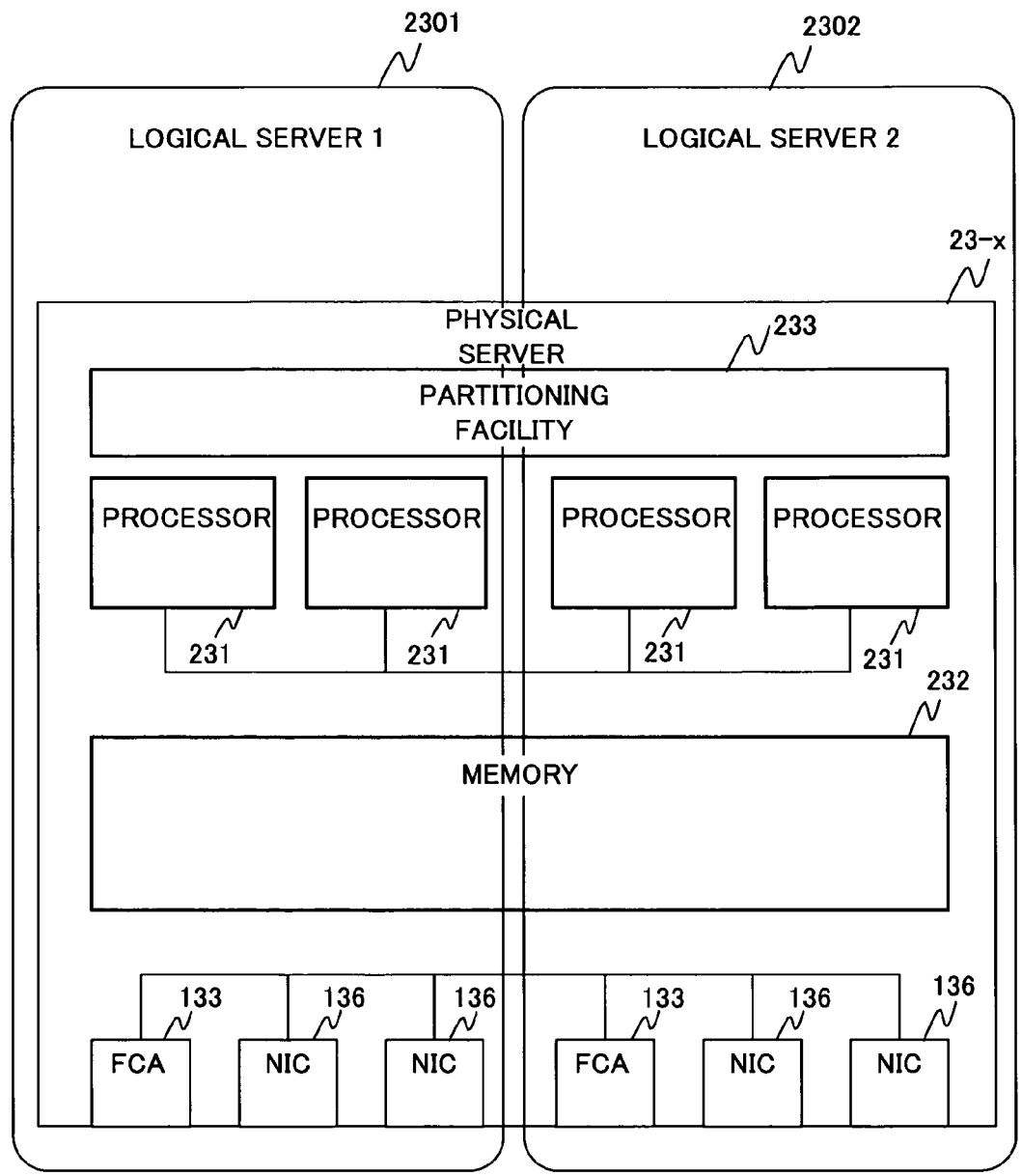
FIG. 23 is a server block diagram showing an example of logical partitioning according to the third embodiment.

In a step S253, the NIC 136, the FCA 133 and other devices of a chosen server (physical computer) 23-*x* are allocated as shown in FIG. 23 to the logical sections created in the step S252, to thereby create Logical Server One and Logical Server Two. Shown in FIG. 23 is a case in which a partitioning function 233 (middleware of the like) divides four processors 231 into two logical sections, and a half of the memory 232 as well as a half of the devices including the NIC 136 and the FCA 133 are given to each of the two logical sections to create Logical Server One (2301) and Logical Server Two (2302).

In a step S254, Logical Server One and Logical Server Two created in the step S253 are added to the server management table 42, and then services for which "recovery required" is entered as the recovery condition 414 are allocated to the chosen server 23-*x* and to the logical servers 2301 and 2302.

FIG. 25 shows a part of the server management table 42 of when the logical servers 2301 and 2302 are created in one of the physical computers 23.

In FIG. 25, the physical computer 23-*x* of FIG. 23 has a server identifier 1 whereas the logical servers (logical computers in FIG. 25) 2301 and 2302 have server identifiers 2 and 3, respectively. After the logical servers are created, the status of the physical computer, which has the server identifier 1, is changed to "in use" in the server management table 42. Then entries for the server identifiers 2 and 3 are added to the table. A half of the processors, memory, devices, and storage of the physical computer are allocated to each of the two logical servers. After services are assigned to the logical servers, the status 427 is changed to "in use" in the entries for the server identifiers 2 and 3.

After the logical partitioning is finished, whether there are enough resources available or not is judged again in a step S255. This judging step is taken when, for example, no servers 23 are found in the step S251 that can be logically partitioned. When it is judged in the step S255 that the secondary site 2 does not have enough resources available, the processing proceeds to a step S256 to create virtual computers (virtual machines).

In the step S256, the server management table 42 is searched for free servers whose status 427 is "not in use" to choose the servers 23 that can produce virtual computers. In other words, a free server is checked for whether it has a processor capable of running plural OSs, and the servers 23 that are judged from the processor classification 422 to have a preset level of performance are chosen. The choice may be made such that the servers 23 that have processors whose drive frequency and memory capacity exceed a preset threshold are chosen.

In a step S257, a host OS is activated on a chosen server 23-*x* and as many guest OSs as determined by the performance of the processor (two guest OSs, for example) are activated to create virtual computers.

Figure 24:
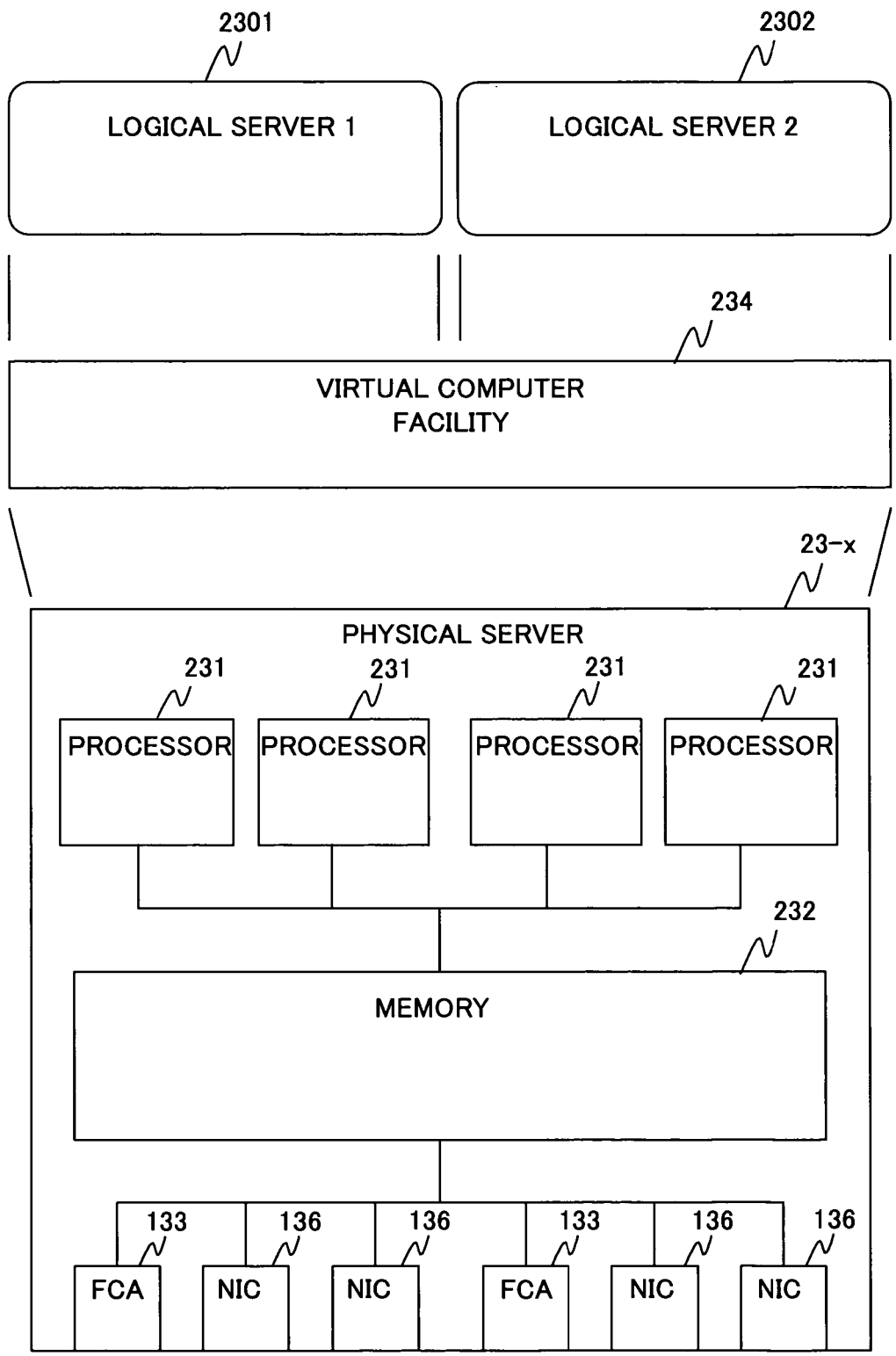
FIG. 24 is a server block diagram showing an example of a virtual computer according to the third embodiment.

In a step S258, the NIC 136, the FCA 133 and other devices of a chosen server (physical computer) 23-*x* are allocated as shown in FIG. 24 to the virtual computers (logical servers in FIG. 24), 2301 and 2302, created in the step S257, to thereby create Logical Server One and Logical Server Two. Shown in FIG. 24 is an example in which two virtual computers (logical servers) are run on a virtual computer facility 234. The virtual computer facility 234 allocates the memory 232 as well as the devices including the NIC 136 and the FCA 133 to Logical Server One (2301) and Logical Server Two (2302).

In a step S259, Logical Server One and Logical Server Two created in the step S258 are added to the server management table 42 as in the logical partitioning described above, and then services for which "recovery required" is entered as the recovery condition 414 are assigned to the chosen server 23-*x* and to the logical servers 2301 and 2302.

As has been described, essential services can be taken over by the secondary site 2 despite shortage of available resources by applying logical partitioning or virtual computers to the servers 23 of the secondary site 2.

Fourth Embodiment

Figure 26:
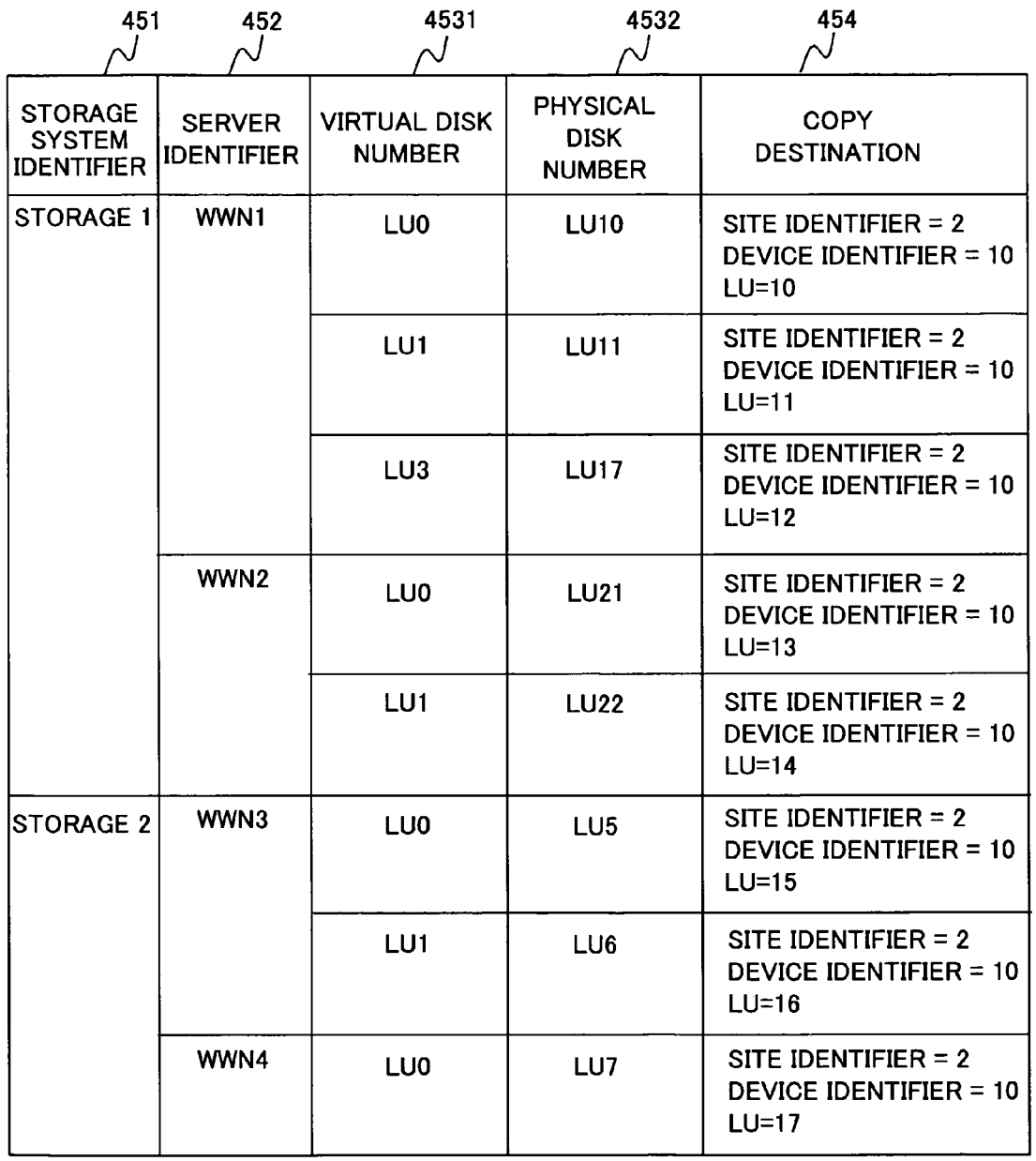
FIG. 26 is an explanatory diagram showing an example of a storage management table in a configuration information management facility according to a fourth embodiment of this invention.
Figure 27:
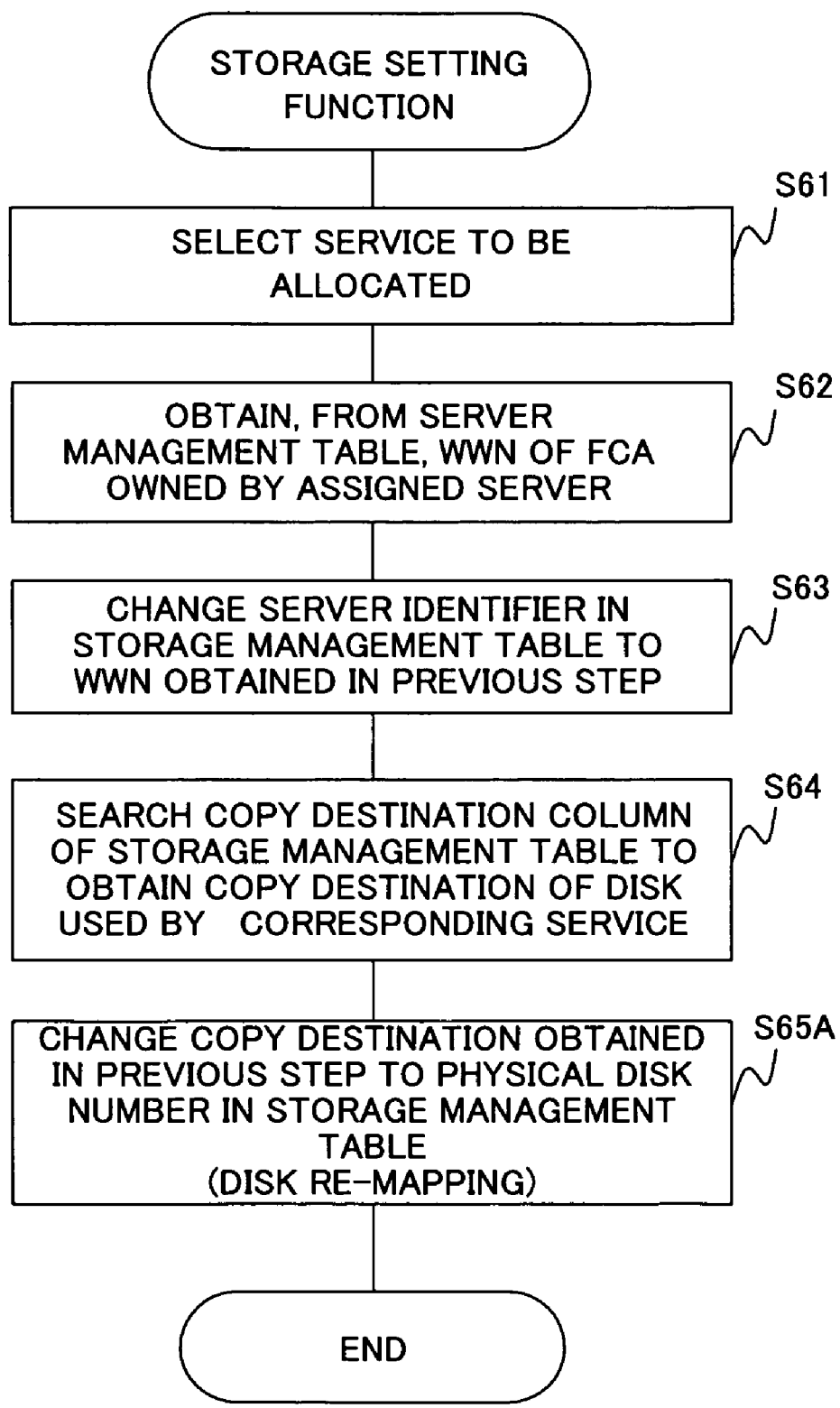
FIG. 27 is a flow chart showing an example of processing performed by a storage setting function of the configuration information management facility according to the fourth embodiment.
Figure 28:
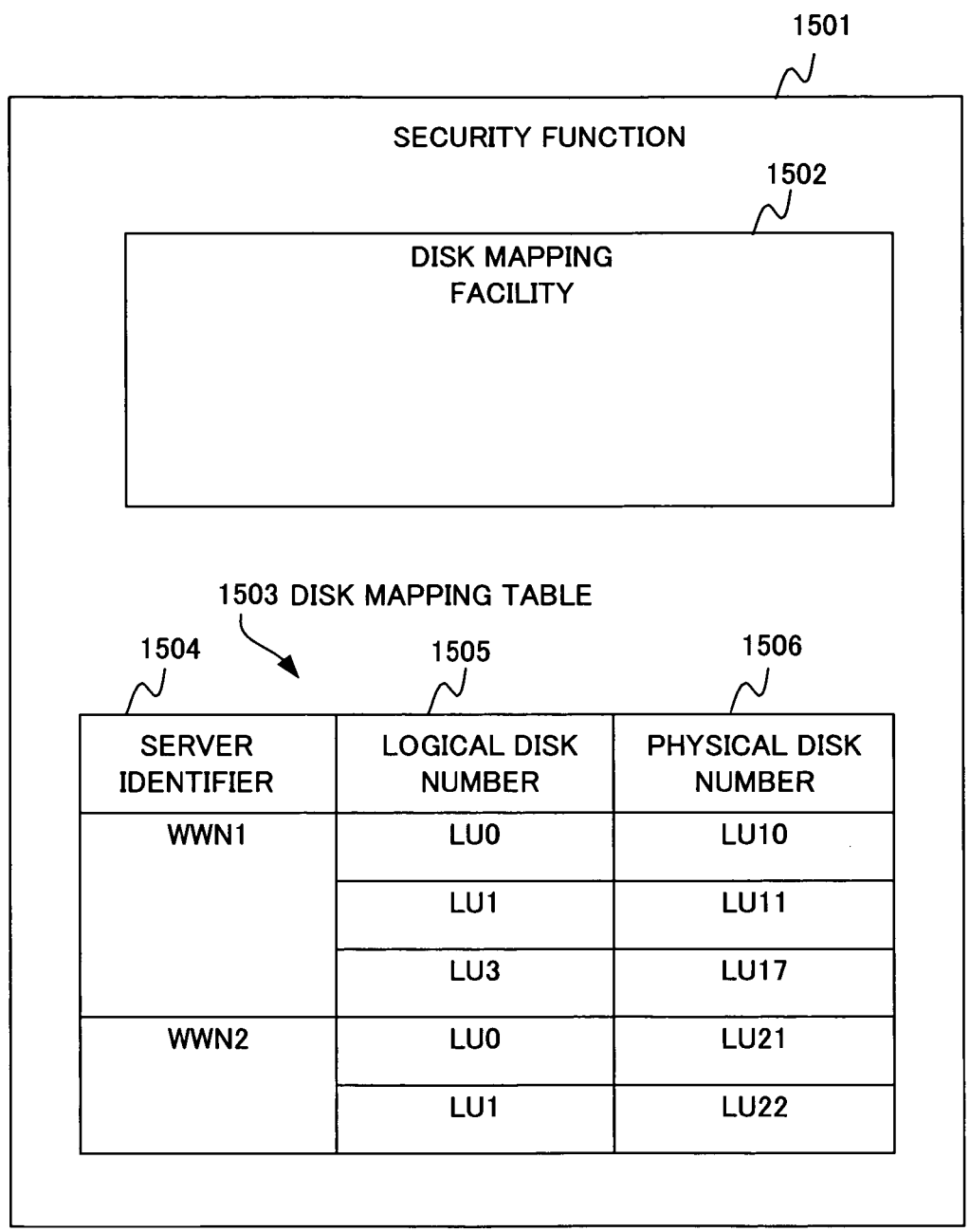
FIG. 28 is a block diagram showing an example of a security function of a storage system according to the fourth embodiment.

FIGS. 26 to 28 show a fourth embodiment of this invention in which the storage setting function 117 of the first embodiment utilizes a re-mapping function of the storage system 25 to replace logical disk numbers allocated to the servers 23 of the secondary site 2 with virtual disk numbers, so that the same logical disk numbers as on the primary site 1 are allocated. The rest of the fourth embodiment is configured the same way as the first embodiment.

To some of applications run on the servers 13 of the primary site 1, fixed logical disks are applied. When such applications are included in boot images copied to the secondary site 2, the applications may not function upon site recovery unless the secondary site 2 has the same logical disk numbers as the primary site 1.

The storage systems 15 and 25 have, as one of security functions, a re-mapping function with which arbitrary virtual disk numbers are assigned to allocated logical disk numbers (hereinafter referred to as physical disk numbers), so that the servers 13 and 23 identify logical disks by virtual disk numbers.

FIG. 26 shows an example of the storage management table 45 of the secondary site 2. In this example, the primary site 1 has two storage systems (storage identifier: 1 and 2) in which logical disks are given physical disk numbers (4532) LU5 to LU7, LU10, LU11, LU17, LU21 and LU22.

Logical disks having virtual disk numbers (4531) 0, 1, and 3 are allocated to one of the servers 13 that executes Service One and that has WWN1 as its server identifier.

The storage system 25 of the secondary site 2 has a similar configuration, and arbitrary virtual disk numbers 4531 can be assigned to physical disk numbers 4532 in the storage system 25 by the re-mapping function.

The re-mapping function is, as shown in FIG. 28, executed by a disk mapping facility 1502 of the security function 1501 in each of the storage systems 15 and 25. The disk mapping facility 1502 has a disk mapping table 1503 composed of a physical disk number 1506, which indicates a number assigned to a physical disk in the storage system, a virtual disk number 1505, which indicates a virtual disk number assigned to the physical disk number 1506, and a server identifier 1505, which indicates the identifier of a server to which logical disks identified by the virtual disk number 1505 are allocated. The disk mapping facility 1502 manages the virtual disk number 1505 and the physical disk number 1506 within the storage system, and manages server identifiers as well.

FIG. 27 shows an example of how the storage setting function 117 using the re-mapping function is executed on the secondary site 2. The steps S61 to S64 of FIG. 27 are the same as those in FIG. 19, which illustrates the storage setting function of the first embodiment.

In the step S61, a service of the primary site 1 is designated out of the services selected in the steps S13 to S23 of FIG. 13 in the first embodiment.

In the step S62, one of the servers 23 of the secondary site 2 that is assigned to the designated service of the primary site 1 is chosen, and a WWN assigned to the FCA 133 of the chosen one of the servers 23 is obtained from the device column 424 in the server management table 42 of the secondary site 2.

In the step S63, the service management table 41 and storage management table 45 of the primary site 1 are read out of a copy of the configuration information 40 of the primary site 1 which has been backed up to the configuration information storing area 252 of the secondary site 2. The read tables are consulted to obtain, from the column of the copy destination 454, a site identifier and a system identifier that are associated with a logical disk used on the primary site 1 for the service designated in the step S61.

When the obtained site identifier indicates the secondary site 2 (site identifier: 2), the storage system 25 that is identified by the obtained system identifier is chosen. The WWN obtained in the step S62 is set in the column of the server identifier 452 of an entry for the chosen storage system 25 in the storage management table 45 of the secondary site 2. In the case where the storage management table 45 of the secondary site 2 does not have an entry for the storage system 25 that is chosen, a new entry is added to the table to set the system identifier and the server identifier.

In the step S64, a system identifier and a disk number that are associated with a logical disk used on the primary site 1 for the service designated in the step S61 are obtained from the column of the copy destination 454 in (the copy of) the storage management table 45 of the primary site 1 which is read in the step S63.

In a step S65A, every disk number obtained in the step S64 is expressed as the virtual disk numbers 4531 and assigned to the physical disk numbers 4532 that are associated with the server identifier 452 set in the step S63. Then the management server 21 instructs the storage system 25 to reflect the association relation set between the virtual disk numbers 4531, the physical disk numbers 4532, and the server identifiers in the storage management table 45.

The processing of the steps S61 to S65A is executed, one server at a time, for all of the servers 23 that are assigned to any one of services to be newly allocated on the secondary site 2.

Accordingly, when the secondary site 2 is to recover the primary site 1 where applications of the servers 13 that execute Service One access logical disks having logical disk numbers 0, 1, and 3, the virtual disk numbers 4531 of the disks that are accessed by the server 13-1 on the primary site 1 are assigned to the physical disk numbers 4532 that are the copy destinations of the virtual disk numbers (logical disk numbers) 0, 1, and 3. The assigned virtual disk numbers 4531 are associated with the identifiers of the servers 23 that take over Service One of the primary site 1.

The processing of the steps S61 to S65A makes it possible to assign the virtual disk number 1505 in a manner that gives the storage system 25 of the secondary site 2 the same logical disk numbers as on the primary site 1 when logical disk numbers of disks accessed by applications are fixed. Therefore, an application run on the servers 23 can access the storage system 25 in seemingly the same environment as the primary site 1, and the primary site 1 is recovered easily and quickly irrespective of the type of the application.

The first, second and fourth embodiments show an example in which the service management table 41 of the primary site 1 and the service management table of the secondary site 2 are compiled together to execute services of the two sites in accordance with the priority and recovery condition 414 of the compiled table. Alternatively, services of the primary site 1 may be put above services of the secondary site 2.

In FIG. 1, an IP network of the like may connect the management server 11 of the primary site 1 with the management server 21 of the secondary site 2, thereby enabling the management server 21 to detect a failure in the management server 11 and subsequently activate the re-creation function 112.

In the embodiments described above, the configuration information management facilities 110 and 210 are run on the management servers 11 and 21 installed on the primary site 1 and the secondary site 2, respectively. Alternatively, the configuration information management facility 110 may be run on one of the servers 13 arbitrarily selected whereas the configuration information management facility 210 is run on one of the servers 23 arbitrarily chosen.

As has been described, this invention makes it possible to quickly reproduce one computer system with another computer system by transferring, in advance, configuration information as well as data of the former computer system to the latter computer system. The invention is therefore applicable to disaster recovery and server integration.

While the present invention has been described in detail and pictorially in the accompanying drawings, the present invention is not limited to such detail but covers various obvious modifications and equivalent arrangements, which fall within the purview of the appended claims.

What is claimed is:

1. A method of reproducing a configuration of a computer system comprising:

a first computer system, which comprises server devices and a storage system, and executes at least one service; and a second computer system, which comprises server devices and a storage system, and executes the at least one service that has been executed by the first computer system, the method comprising the following computer-implemented steps:

collecting an association relation between the at least one service and each of the server devices that are run in the first computer system, and collecting, from among information pieces on components of the each of the server devices of the first computer system, at least one of a processor classification, memory information, and device information, to thereby obtain the collected association relation and the information pieces on the components of the each of the server devices as configuration information of the first computer system;

copying data of the at least one service of the first computer system and the configuration information to the second computer system; and assigning, in the second computer system, the at least one service of the first computer system to each of the server devices of the second computer system based on the copied configuration information of the first computer system, wherein the assigning the at least one service of the first computer system to the each of the server devices of the second computer system comprises:

searching, based on the copied configuration information of the first computer system, the second computer system for one of the server devices of the second computer system having at least one of a processor classification, memory information, and device information, which coincides with at least one condition of the processor classification, the memory information, and the device information of the first computer system, and obtaining, based on the device information, a device identifier of a device of the one of the server devices of the second computer system, which is coupled to the storage system of the second computer system; and setting the device identifier to the storage system of the second computer system to associate the one of the server devices of the second computer system, which has been searched for, with the storage system of the second computer system.

2. The method of reproducing a computer system configuration according to claim 1, wherein the assigning of services of the first computer system to server devices of the second computer system is performed when a failure occurs in the first computer system.

3. The method of reproducing a computer system configuration according to claim 1, wherein the first computer system includes plural computer systems, and wherein the assigning of services of the first computer system to server devices of the second computer system includes allocating services of the first computer system to server devices of the second computer system in a manner that integrates the plural computer systems constituting the first computer system into the second computer system.

4. The method of reproducing a computer system configuration according to claim 1, wherein the copying of data of the services of the first computer system and the configuration information to the second computer system includes copying also images of software executed by the server devices of the first computer system.

5. The method of reproducing a computer system configuration according to claim 1, wherein the assigning of services of the first computer system to server devices of the second computer system includes:

assigning virtual disk numbers of the storage system of the first computer system to server devices of the second computer system based on the server device-storage system association relations in the first computer system.

6. A computer system, comprising:

a first computer system, which comprises server devices and a storage system, and executes at least one service; and a second computer system, which comprises server devices and a storage system, and executes the at least one service that has been executed by the first computer system, wherein the first computer system further comprises a first management unit which is configured to:

collect an association relation between the at least one service and each of the server devices that are run in the first computer system, and collect, from among information pieces on components of the each of the server devices of the first computer system, at least one of a processor classification, memory information, and device information, to thereby obtain the collected association relation and the information pieces on the components of the each of the server devices as configuration information of the first computer system; and copy data of the at least one service of the first computer system and the configuration information to the second computer system, wherein the second computer system further comprises a second management unit for assigning the at least one service of the first computer system to each of the server devices of the second computer system based on the copied configuration information of the first computer system, and wherein the second management unit is configured to:

search, based on the copied configuration information of the first computer system, the second computer system for one of the server devices of the second computer system having at least one of a processor classification, memory information, and device information, which coincides with at least one condition of the processor classification, the memory information, and the device information of the first computer system, and obtain, based on the device information, a device identifier of a device of the one of the server devices of the second computer system, which is coupled to the storage system of the second computer system; and set the device identifier to the storage system of the second computer system to associate the one of the server devices of the second computer system, which has been searched for, with the storage system of the second computer system.

7. The computer system according to claim 6, wherein the second management unit assigns the at least one service of the first computer system to the each of the server devices of the second computer system when a failure occurs in the first computer system.

8. The computer system according to claim 6, wherein the first computer system comprises a plurality of computer systems, and wherein the second management unit assigns the at least one service of the first computer system to the each of the server devices of the second computer system so as to integrate the plurality of computer systems constituting the first computer system into the second computer system.

9. The computer system according to claim 6, wherein the first management unit further copies images of software executed by the server devices of the first computer system.

10. The computer system according to claim 6, wherein the second management unit assigns virtual disk numbers of the storage system of the first computer system to the server devices of the second computer system based on an association relation between the each of the server devices and the storage system of the first computer system.

11. A method of reproducing a computer system configuration to cause a second computer system to execute one or more services that have been executed by a first computer system, the first computer including server devices and a storage system, the second computer including server devices and a storage system, the method comprising the following computer-implemented steps:

using a first configuration information manager of the first computer system to collect a set of first association relations between the one or more services that are executed by the first computer system and the server devices of the first computer system;

using the first configuration information manager of the first computer system to collect a set of second association relations among the server devices of the first computer system, the storage system of the first computer system, and a set of first processor classifications of the server devices of the first computer system;

using the first configuration information manager of the first computer system to collect a third association relation between the storage system of the first computer system and the storage system of the second computer system;

using the first configuration information manager of the first computer system to store the set of first association relations, the set of second association relations, and the third association relation in the storage system of the first computer system as configuration information of the first computer system;

copying data of the one or more services that are executed by the first computer system and the configuration information of the first computer system from the storage system of the first computer system to the storage system of the second computer system;

using a second configuration information manager of the second computer system to collect a set of fourth association relations between one or more services that are executed by the second computer system and the server devices of the second computer system;

using the second configuration information manager of the second computer system to collect a set of fifth association relations among the server devices of the second computer system, the storage system of the second computer system, and a set of second processor classifications of the server devices of the second computer system;

using the second configuration information manager of the second computer system to store the set of fourth association relations and the set of fifth association relations in the storage system of the second computer system as configuration information of the second computer system;

using the second configuration information manager of the second computer system to select, based on the configuration information of the first computer system copied to the storage system of the second computer system, a set of server devices from the server devices of the second computer system for executing the one or more services that have been executed by the first computer system;

using the second configuration information manager of the second computer system to assign the one or more services executed by the first computer system to the selected set of server devices of the second computer system; and using the second configuration information manager of the second computer system to associate the selected set of server devices of the second computer system to which the one or more services executed by the first computer system are assigned with the storage system of the second computer system, and wherein the second configuration information manager of the second computer system selects the selected set of server devices of the second computer system by:

referring to the second set of association relations of the configuration information of the first computer system copied to the storage system of the second computer system to obtain the set of first processor classifications of the server devices of the first computer system used by the first computer system for the one or more services executed by the first computer system as performance information on the server devices;

comparing the obtained set of first processor classifications with the set of second processor classifications to select the server devices of the second computer system having a second processor classification that matches with a first processor classification of the obtained set of first processor classifications as the selected set of server devices of the second computer system; and assigning the one or more services of the first computer system to the server devices of the selected set of server devices of the second computer system according to the matching between the set of second processor classifications and the obtained set of first processor classifications.

12. The method of reproducing a computer system configuration according to claim 11, wherein the first computer system and the second computer system each have a network device, wherein the first configuration information manager of the first computer system stores the configuration information of the first computer system in the storage system of the first computer system by:

collecting a set of service-virtual network identifier association relations between services executed by the first computer system and identifiers of virtual networks to which the services belong; and storing the set of service-virtual network identifier association relations as a part of the configuration information in the storage system of the first computer system, and wherein the second configuration information manager of the second computer system assigns the one or more services executed by the first computer system to the selected set of server devices of the second computer system by setting, based on the configuration information copied to the second computer system, the network device of the second computer system such that the server devices of the second computer system that are assigned to the services belong to the virtual networks to which the services belong.

13. The method of reproducing a computer system configuration according to claim 12, wherein the second configuration information manager of the second computer system sets the network device of the second computer system by obtaining, when a virtual network identifier of the network device of the first computer system and a virtual network identifier of the network device of the second computer system overlap, a new virtual network identifier that is different from the virtual network identifier of the network device of the first computer system.

14. The method of reproducing a computer system configuration according to claim 11, wherein the first configuration information manager of the first computer system stores the configuration information of the first computer system in the storage system of the first computer system by collecting information indicating a type of the server devices of the first computer system, and storing the information as a part of the configuration information in the storage system of the first computer system, and wherein the second configuration information manager of the second computer system assigns the one or more services executed by the first computer system to the selected set of server devices of the second computer system by assigning, based on the information indicating a type of the server devices that is contained in the configuration information copied to the second computer system, server devices of the second computer system that are of the same type as the server devices of the first computer system.

15. The method of reproducing a computer system configuration according to claim 11, wherein copying data of the one or more services that are executed by the first computer system and the configuration information of the first computer system from the storage system of the first computer system to the storage system of the second computer system includes copying the configuration information to the second computer system when there is a change in configuration of the first computer system.

16. The method of reproducing a computer system configuration according to claim 11, wherein the first computer system and the second computer system each have a storage switch, which connects the server devices with the storage system, wherein the first configuration information manager of the first computer system stores the configuration information of the first computer system in the storage system of the first computer system by:

collecting service-zone identifier association relations between services executed by the first computer system and identifiers of storage switch zones to which the services belong; and storing the service-zone identifier association relations as a part of the configuration information in the storage system of the first computer system, and wherein the second configuration information manager of the second computer system assigns the one or more services executed by the first computer system to the selected set of server devices of the second computer system by setting, based on the configuration information copied to the second computer system, the storage switch of the second computer system such that the server devices of the second computer system that are assigned to the services belong to the zones.

17. The method of reproducing a computer system configuration according to claim 16, wherein setting of the storage switch of the second computer system includes setting the storage switch of the second computer system by obtaining, when a zone identifier of the storage switch of the first computer system and a zone identifier of the storage switch of the second computer system overlap, a new zone identifier that is different from the zone identifier of the storage switch of the first computer system.

18. The method of reproducing a computer system configuration according to claim 11, wherein the set of first association relations includes priority levels set for each service in advance, and wherein the second configuration information manager of the second computer system assigns the one or more services executed by the first computer system to the selected set of server devices of the second computer system by assigning services in the order of the set priority in a case where not all of the services of the first computer system can be assigned to the server devices of the second computer system.

19. The method of reproducing a computer system configuration according to claim 11, wherein the set of first association relations includes a reproduction condition, which is set for each service in advance to indicate whether or not the service is required to be executed in the reproduced computer system, and wherein the second configuration information manager of the second computer system assigns the one or more services executed by the first computer system to the selected set of server devices of the second computer system by assigning services whose execution is required according to the reproduction condition first in a case where not all of the services of the first computer system can be assigned to the server devices of the second computer system.

20. The method of reproducing a computer system configuration according to claim 19, wherein the second configuration information manager of the second computer system assigns the one or more services executed by the first computer system to the selected set of server devices of the second computer system further by, when not all of the services whose execution is required according to the reproduction condition can be assigned to the server devices of the second computer system, partitioning the server devices of the second computer system to create logical servers, and assigning the services to the created logical servers as well as to physical servers.

21. The method of reproducing a computer system configuration according to claim 11, wherein the second configuration information manager of the second computer system assigns the one or more services executed by the first computer system to the selected set of server devices of the second computer system upon a failure occurring in the first computer system.

22. The method of reproducing a computer system configuration according to claim 11, wherein the first computer system includes a plurality of computer systems, and wherein the second configuration information manager of the second computer system assigns the one or more services executed by the first computer system to the selected set of server devices of the second computer system by allocating services of the first computer system to server devices of the second computer system in a manner that integrates the plurality of computer systems constituting the first computer system into the second computer system.

23. The method of reproducing a computer system configuration according to claim 11, wherein copying data of the one or more services that are executed by the first computer system and the configuration information of the first computer system from the storage system of the first computer system to the storage system of the second computer system includes copying images of software executed by the server devices of the first computer system.

24. The method of reproducing a computer system configuration according to claim 11, wherein the first computer system includes a plurality of computer systems, and wherein the second configuration information manager of the second computer system assigns the one or more services executed by the first computer system to the selected set of server devices of the second computer system by assigning virtual disk numbers of the storage system of the first computer system to server devices of the second computer system based on the second association relations.

25. The method of reproducing a computer system configuration according to claim 11, the first configuration information manager of the first computer system collects the set of second association relations by collecting first processor performance information on the server devices of the first computer system, first memory information on the server devices of the first computer system, and first device information on the server devices of the first computer system in addition to the set of second association relations; and the second configuration information manager of the second computer system collects the set of fifth association relations by collecting second processor performance information on the server devices of the second computer system, second memory information on the server devices of the second computer system, and second device information on the server devices of the second computer system in addition to the fifth association relations.

26. The method of reproducing a computer system configuration according to claim 25, wherein the second configuration information manager of the second computer system selects the selected set of server devices of the second computer system further by:

referring to the second association relations of the configuration information of the first computer system copied to the storage system of the second computer system to obtain the first processor performance information, the first memory information, and the first device information;

comparing first performance information including the second processor performance information, the second memory information, and the second device information with second performance information including the first processor performance information, the first memory information, and the first device information; and
assigning the one or more services of the first computer system to server devices in the second computer system having performance information close to the performance information of the server devices of the first computer system.

* * * * *